United States Patent
Edry et al.

(10) Patent No.: US 11,057,702 B1
(45) Date of Patent: Jul. 6, 2021

(54) METHOD AND SYSTEM FOR REDUCING AUDIO FEEDBACK

(71) Applicant: MICROSOFT TECHNOLOGY LICENSING, LLC, Redmond, WA (US)

(72) Inventors: Philip Andrew Edry, Seattle, WA (US); Jagan Jayaraj Howe, Bothall, WA (US); Malarvizhi Chinnusamy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/724,077

(22) Filed: Dec. 20, 2019

(51) Int. Cl.
| H04R 3/02 | (2006.01) |
| G06F 3/0482 | (2013.01) |
| H04R 29/00 | (2006.01) |
| G06F 3/0484 | (2013.01) |
| G06F 3/16 | (2006.01) |
| G06Q 10/10 | (2012.01) |

(52) U.S. Cl.
CPC ............ H04R 3/02 (2013.01); G06F 3/0482 (2013.01); G06F 3/04847 (2013.01); G06F 3/165 (2013.01); G06Q 10/1093 (2013.01); H04R 29/001 (2013.01)

(58) Field of Classification Search
CPC ...... H04R 3/02; H04R 29/001; H04R 29/004; H04B 15/00; G06F 3/0482; G06F 3/0487; G06F 3/165; G06Q 10/1093
USPC .......................... 381/83, 93, 94.5; 348/14.11
See application file for complete search history.

(56) References Cited

U.S. PATENT DOCUMENTS

| 6,674,451 | B1 | 1/2004 | Fado et al. |
| 7,185,054 | B1* | 2/2007 | Ludwig ................. G06F 3/0482 348/E7.081 |
| 7,876,890 | B2 | 1/2011 | Diethorn |
| 7,911,983 | B2* | 3/2011 | Patel ....................... G06F 9/451 370/259 |
| 7,973,857 | B2 | 7/2011 | Ahmaniemi et al. |

(Continued)

FOREIGN PATENT DOCUMENTS

| EP | 3253039 A1 | 12/2017 |
| WO | 2019067718 A2 | 4/2019 |

OTHER PUBLICATIONS

"Audio Echo Elimination with Proximity Detection", Retrieved from: https://support.zoom.us/hc/en-us/articles/216281983-Audio-Echo-Elimination-with-Proximity-Detection, Retrieved on: Nov. 7, 2019, 2 Pages.

(Continued)

Primary Examiner — Xu Mei
(74) Attorney, Agent, or Firm — NovoTechIP International PLLC

(57) ABSTRACT

A system and method for reducing audio feedback, and in particular 'howling', during a communication session involving two or more computing devices. The system determines that a first device is likely to join a meeting in which another, second device is already joined. In response, the system can cause the second device to broadcast a signal that, if detected by the first device, will indicate that the two devices are in auditory range of one another. As a result, the system can preemptively mute the audio components of the first device to prevent an audio stream of the first device from interfering with the audio already streaming via the second device.

20 Claims, 16 Drawing Sheets

(56) References Cited

U.S. PATENT DOCUMENTS

| | | | |
|---|---|---|---|
| 8,296,364 | B2 | 10/2012 | Alexandrov et al. |
| 8,488,745 | B2 | 7/2013 | Cutler |
| 9,329,833 | B2 * | 5/2016 | Swierk .................... H04L 43/08 |
| 9,369,673 | B2 | 6/2016 | Ma et al. |
| 9,495,663 | B2 | 11/2016 | Ramaswamy et al. |
| 9,584,964 | B2 | 2/2017 | Pelkey |
| 9,632,746 | B2 * | 4/2017 | Keipert ................ H04N 5/4403 |
| 10,764,442 | B1 * | 9/2020 | Delaney ................ H04M 3/568 |
| 2015/0117626 | A1 | 4/2015 | Nord |
| 2015/0124950 | A1 | 5/2015 | Koenig |
| 2016/0071065 | A1 | 3/2016 | Ohashi et al. |
| 2018/0048768 | A1 * | 2/2018 | Spittle .................... H04S 7/302 |
| 2018/0124128 | A1 * | 5/2018 | Faulkner ............. H04L 65/1093 |
| 2019/0200175 | A1 * | 6/2019 | Ylonen .................. H04W 4/10 |

OTHER PUBLICATIONS

"Audio Echo in a Meeting", Retrieved from: https://support.zoom.us/hc/en-us/articles/202050538-Audio-Echo-In-A-Meeting, Retrieved on: Nov. 7, 2019, 2 Pages.

"How to Reduce the Feedback Loop Between the Microphone and Speakers in Windows 7", Retrieved from: https://support.microsoft.com/en-in/help/2577040/how-to-reduce-the-feedback-loop-between-the-microphone-and-speakers-in, Retrieved on: Nov. 7, 2019, 2 Pages.

"International Search Report and Written Opinion Issued in PCT Application No. PCT/US20/059759", dated Feb. 17, 2021, 13 pages.

\* cited by examiner

METHOD AND SYSTEM FOR REDUCING AUDIO FEEDBACK

BACKGROUND

Communication systems allow users to communicate with each other over a network. The network may be, for example, the Internet or public switched telephone network (PSTN). Audio signals can be transmitted between nodes of the network, to thereby allow users to transmit and receive audio data (such as speech data) to each other in a communication session over the communication system.

A user device may have audio input means such as a microphone that can be used to receive audio signals such as speech from a user. The user may enter into a communication session with another user, such as a private call (with just two users in the call) or a conference call (with more than two users in the call). The user's speech is received at the microphone, processed and is then transmitted over a network to the other users in the call. The user device may also have audio output means such as speakers for outputting audio signals to near-end user that are received over the network from a far-end user during a call.

If a transmitter and receiver are collocated (e.g., within a few meters of each other), the microphone on the transmitter may become acoustically coupled to the speaker on the receiver. In this case, the loop gain conditions may be such that acoustic coupling sets up an audio feedback loop that creates an undesirable acoustic signal often referred to as "howling," owing to the piercing, shrill sound produced by the receiving speaker. Howling involves saturation in the communication channel and power amplifiers and speakers in the receivers which disrupts communication. Communications between electronic devices such as for group conferencing and data sharing can be negatively impacted by the introduction of such audio feedback or howling into the communications channels. New and improved approaches for improving such interactions between session participants are desirable.

SUMMARY

A system for reducing audio feedback, in accordance with a first aspect of this disclosure, includes one or more processors and one or more machine-readable media including instructions stored therein which, when executed by the one or more processors, cause the system to determine that a triggering event has occurred in connection with a first device, and to determine, based at least on the detection of the triggering event, that the first device is a candidate for joining an upcoming or ongoing communication session. In addition, the instructions cause the system to receive a first indication that the first device received the first signal, thereby determining that the first device is in an auditory range of the second device, and automatically cause audio signals associated with at least a first audio component of the first device to be excluded from the communication session.

A method for reducing audio feedback, in accordance with a second aspect of this disclosure, includes determining that a triggering event has occurred in connection with a first device, and determining, based at least on the detection of the triggering event, that the first device is a candidate for joining an upcoming or ongoing communication session. The method further includes receiving a first indication that the first device received the first signal, thereby determining that the first device is in an auditory range of the second device, and automatically causing audio signals associated with at least a first audio component of the first device to be excluded from the communication session.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
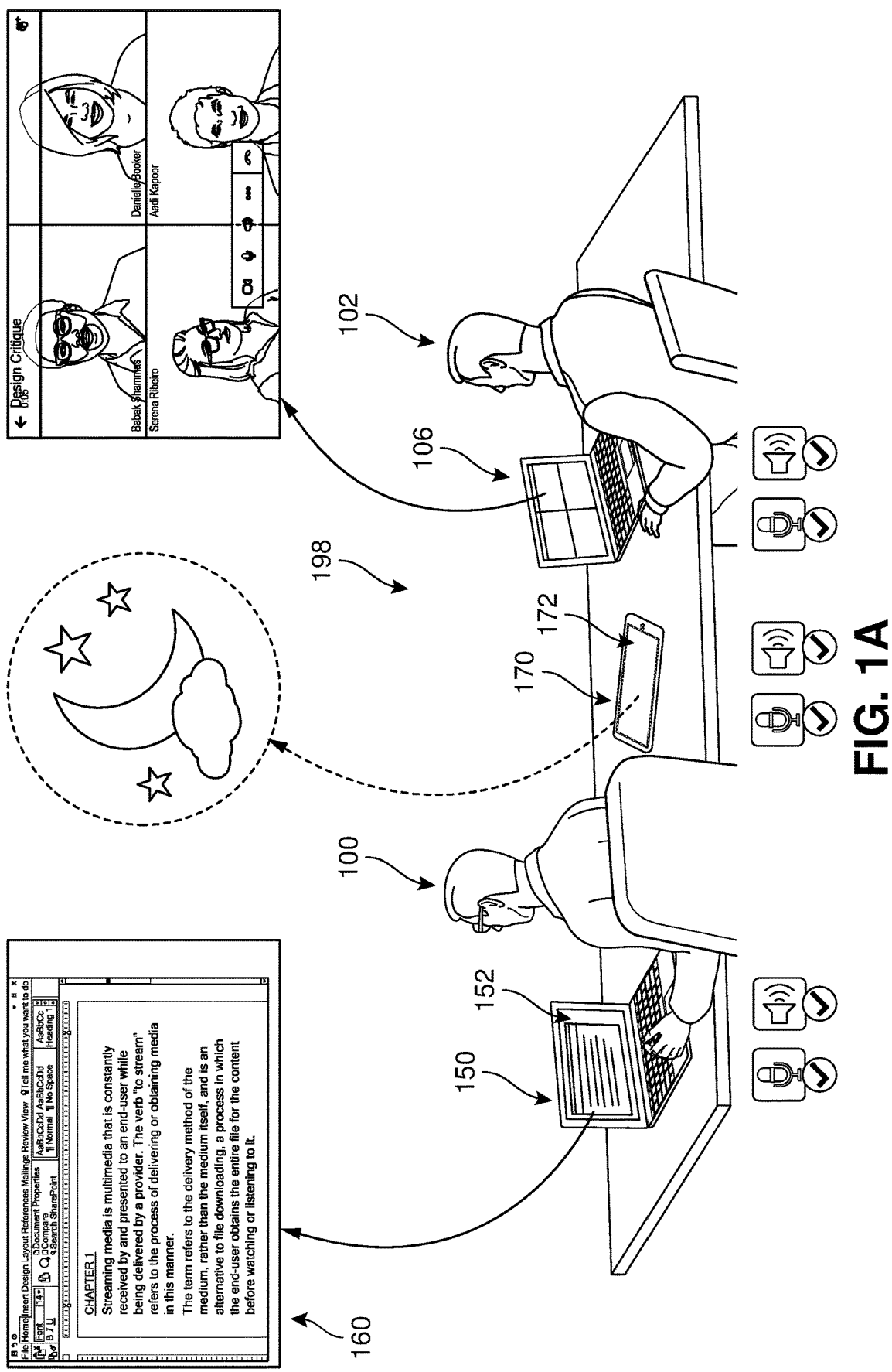
FIGS. 1A and 1B illustrate an overview of an audio feedback reduction system.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. In the following material, indications of direction, such as "top" or "left," are merely to provide a frame of reference during the following discussion, and are not intended to indicate a required, desired, or intended orientation of the described articles.

Though communication sessions involving two or more user devices participating in close proximity (that is, in auditory range of one another) may often be desired, acoustic feedback can result that can negatively impact the quality of the conversation. For instance, a first user at a first user device may be participating in a communication session when a second user at a second user device in the same room joins the same communication session. This scenario may have deleterious results for the user experience, with audio feedback presenting as echoes, ghosting, and howling of an audio stream. The following implementations introduce methods and systems for reducing the occurrence of audio feedback, and in particular howling, prior to and during communication sessions in which multiple audio device endpoints are collocated by automatically excluding the audio generated or captured by at least one of the device endpoints. In some implementations, the system is configured to determine if a device is likely to join an upcoming or ongoing communication session (as a "candidate device"). A signal can be generated by one or more nearby computing devices that are also participating in the same communication session (as "participant devices"). If the candidate device detects this signal, it is understood that the candidate device is in an auditory range of a participant device, and the system can automatically mute or otherwise exclude the playback of audio signals produced by the candidate device. Such preemptive exclusion of audio from the candidate device, occurring in anticipation of a candidate device joining the communication session, ensures that multiple collocated devices can participate in a communication session while in proximity to one another and experience little to no echo or howling effects.

A communication session ("session") may be generally understood to refer to a scheduled call or meeting or other communication event involving two or more device endpoints, each device being associated with one or more audio components. A session can refer to a real time, or near-real time, telecommunication session involving two or more participants. Thus, a meeting can encompass an event, activity, gathering, assembly, class, conference, convention, summit, get-together, congregation, reunion, or the like that may be prescheduled. Examples can include a conference call, a virtual meeting, a World Wide Web (Web) based conference, a videoconference, and/or a multi-party instant messaging (IM) or chat session. In addition, the term scheduled meeting or scheduled conference as used throughout this application can be understood to refer to a communication session that has been scheduled for a particular date/time. Furthermore, while the terms "call" or "meeting" may be used in the description or claims, this should be understood to refer to session-based telecommunications in general and are not limited to voice calls. It will also be appreciated that the systems and methods are not limited to sessions and are applicable to messaging-based or packet-based communications. Thus, such "calls" can include exchange of as any combination of voice data, video data, text data, image data (e.g., presentation data), file data, or any other types of data.

Reference to a communication application, a scheduling application, an organizer application, or simply "application" may be understood to refer to any software application configured to provide a means of scheduling, viewing, modifying, joining a meeting, and/or communicating or transmitting or receiving data associated with the meeting. This can include any type of electronic calendar or electronic scheduling system that is capable of tracking a user's meetings or appointments. Some such programs can include Skype®, Microsoft Teams®, Microsoft Outlook®, GoToMeeting®, WebEx®, Zoom®, Join.Me®, Google Hangouts®, AnyMeeting® and other applications that can provide conferencing tools and/or facilitate communication or collaboration online. These are non-limiting examples, and any other communication-related application may benefit from the disclosed implementations. Specific references to a software application by name throughout this description should not therefore be understood to limit the use of the proposed systems and methods. It should further be understood that in some implementations, the application used to enable an auto-connection function may differ from the application used to schedule the meeting, while in other implementations, they may be the same.

In addition, as a general matter, a candidate device as used herein refers to a computing device associated with at least one audio component such as a microphone or speaker that is identified by the system as being likely to participate in or join an ongoing or upcoming communication session. Such a device may also be understood to be in a pre-joining stage or mode. An upcoming session is a term that may be understood to refer to a communication session that is scheduled to occur or begin in the near future, typically within a window of time extending between a second to 15 or 20 minutes prior to the scheduled start time. In addition, a participant or "joined" device refers to a computing device that has already joined the session (post-joining stage or mode) and is currently participating in an ongoing meeting and/or is in an actively joining stage or mode (e.g., the device has requested admittance to the session, or the device has established a connection to the session and is in a virtual waiting room or lobby awaiting the commencement of the meeting, or is otherwise actively attempting to join the session).

Figure 1B:
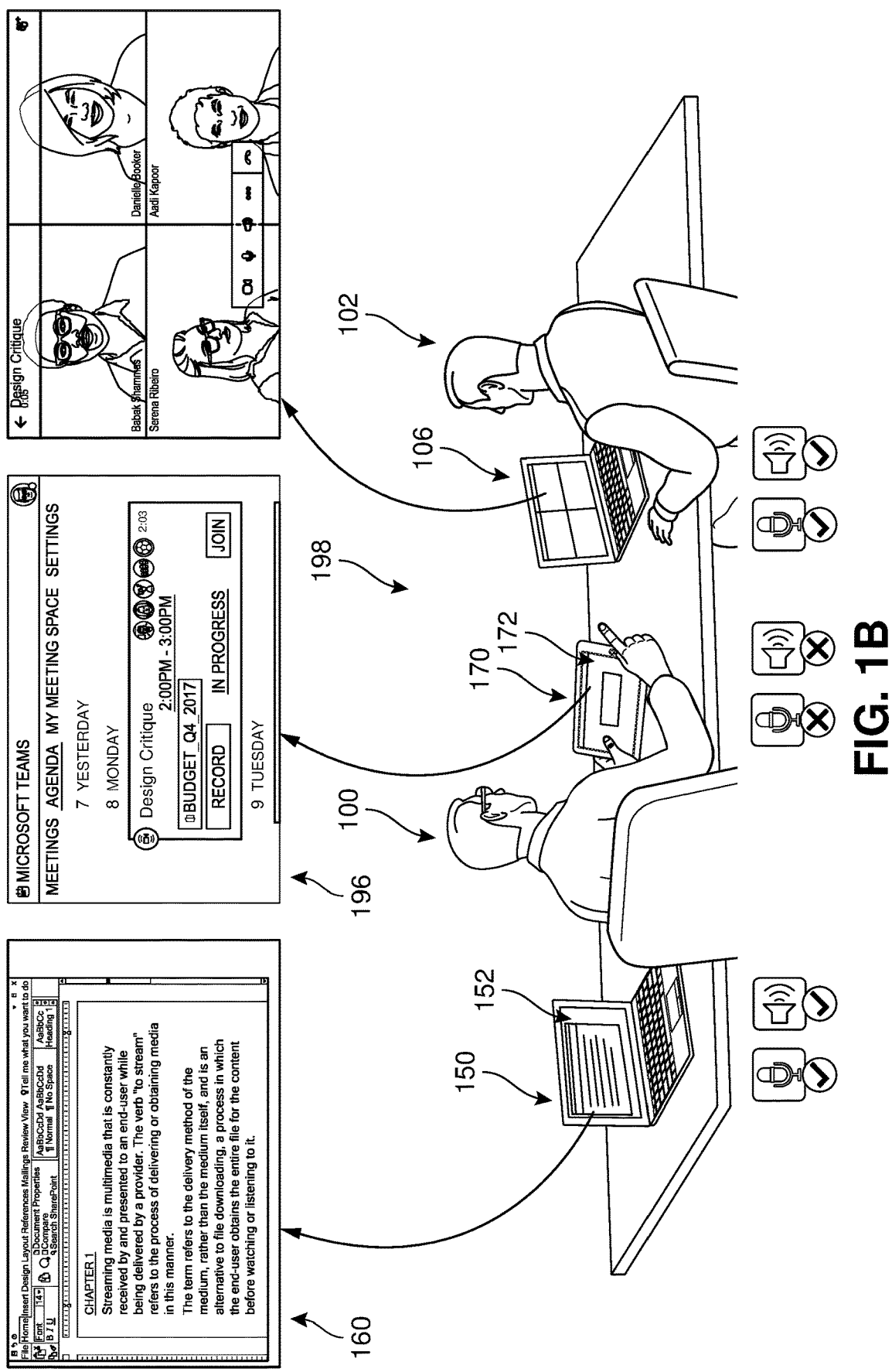

In order to better introduce the systems and methods to the reader, FIGS. 1A and 1B presents a high-level example of a representative environment ("environment") for implementing an audio feedback reduction feature of a communication application system. In different implementations, the environment can include one or more computing device end-users, or simply "users". One or more users can interact with or manipulate data presented via a user device. The various features and activities illustrated in FIGS. 1A and 1B are described generally, with further details and examples presented in connection with later figures.

As an example, a first user 100 and a second user 102 are shown in FIGS. 1A and 1B in a workspace 198. In this case, the first user 100 is a user of both a first client computing system ("first client") 150 and a second client computing system ("second client") 170. The first client 150 shown here is a laptop computer, and the second client is a tablet device. In other implementations, the devices may be a personal computer such as a desktop or laptop computer, a tablet, a mobile device, or any other computer system. The first client 150 and/or second client 170 can execute an operating system such as Microsoft Windows®, Apple macOS®, Apple iOS®, Apple iPadOS®, Android, Unix®, or other operating system, and include memory, storage, a network interface, and other computer hardware not shown in FIG. 1A. In addition, in some implementations, the first client 150 and/or second client 170 can be connected via one or more networks to a server, or an online or cloud-based computing service ("cloud service"). In some examples, as the first user 100 accesses or interacts with electronic content via the first client 150, various content or metadata associated with the content may be updated, transmitted, received, or saved to/from/by the cloud storage through via the one or more networks.

In FIG. 1A, at a first time T1, the first user 100 is seated adjacent to the second user 102 who may be seen participating in an ongoing online communication session via a third client computing system ("third client") 106. The first client 150 and/or second client 170 can each be in 'listening range' of other neighboring devices, such as third client 106. In other words, because the three devices are in close proximity to one another in workspace 198, they may also be able to detect various signals that may be emitted by one or more of the devices. Meanwhile, at the same time, the first user 100 is engaged in reviewing a viewing a document 160 on a display 152 of the first client 150, while a display 172 of the second client 170 is currently dormant. Thus, at this time, it does not appear as if the first user 100 has an intention of participating in the same meeting.

However, at a later, second time T2, shown in FIG. 1B, the first user 100 has completed their review of the document 160 and can now be seen accessing a meeting invite 196 from the second client 170 directed to the ongoing communication session in which the second user 102 is currently participating. In different implementations, as will be discussed in greater detail below, the proposed communication application system can be configured to determine whether a user intends to join a meeting. In this case, the action taken by first user 100 to view the meeting invite 196 via second client 170 during the window of time in which the meeting is scheduled (and is occurring) can represent a type of triggering event for the communication application system, whereby the second client 170 is identified as a potential candidate for participation in the ongoing meeting. The communication application system may perform a device proximity search, by which the communication application system causes a signal to be broadcast from devices currently participating in the meeting (in this case, third client 106). In some implementations, the signal broadcast is initiated in response to the triggering event. If a nearby candidate device detects this signal, the system can automatically cause the nearby candidate device to mute its audio components prior to the first user 100 joining the meeting, proactively preventing the possibility of audio feedback between the two proximate (collocated) devices that are or will be participating in the meeting. However, if a device has not been identified as a candidate device, and appears to have no such intention of joining the meeting, as represented in FIG. 1B by first client 150, the device will remain unaffected by the system. This is the case despite the first client 150 being able to detect the signal generated by the third client 106 (i.e., the first client 150 being within auditory range of the third client 106).

As noted above, implementations of the disclosed communication application system can cause a signal to be broadcast from a device endpoint participating in a communication session to detect if other device endpoints that have been identified as potential participants of the same communication session are close enough to each other to induce echo. In response, control (e.g., muting) of the nearby potential participant devices can be automatically applied by the communication application system to preemptively prevent echo (prior to the actual joining of the device to the session). In some implementations, a notification can also be presented to the user informing them of the occurrence of the mute operation.

Figure 2:
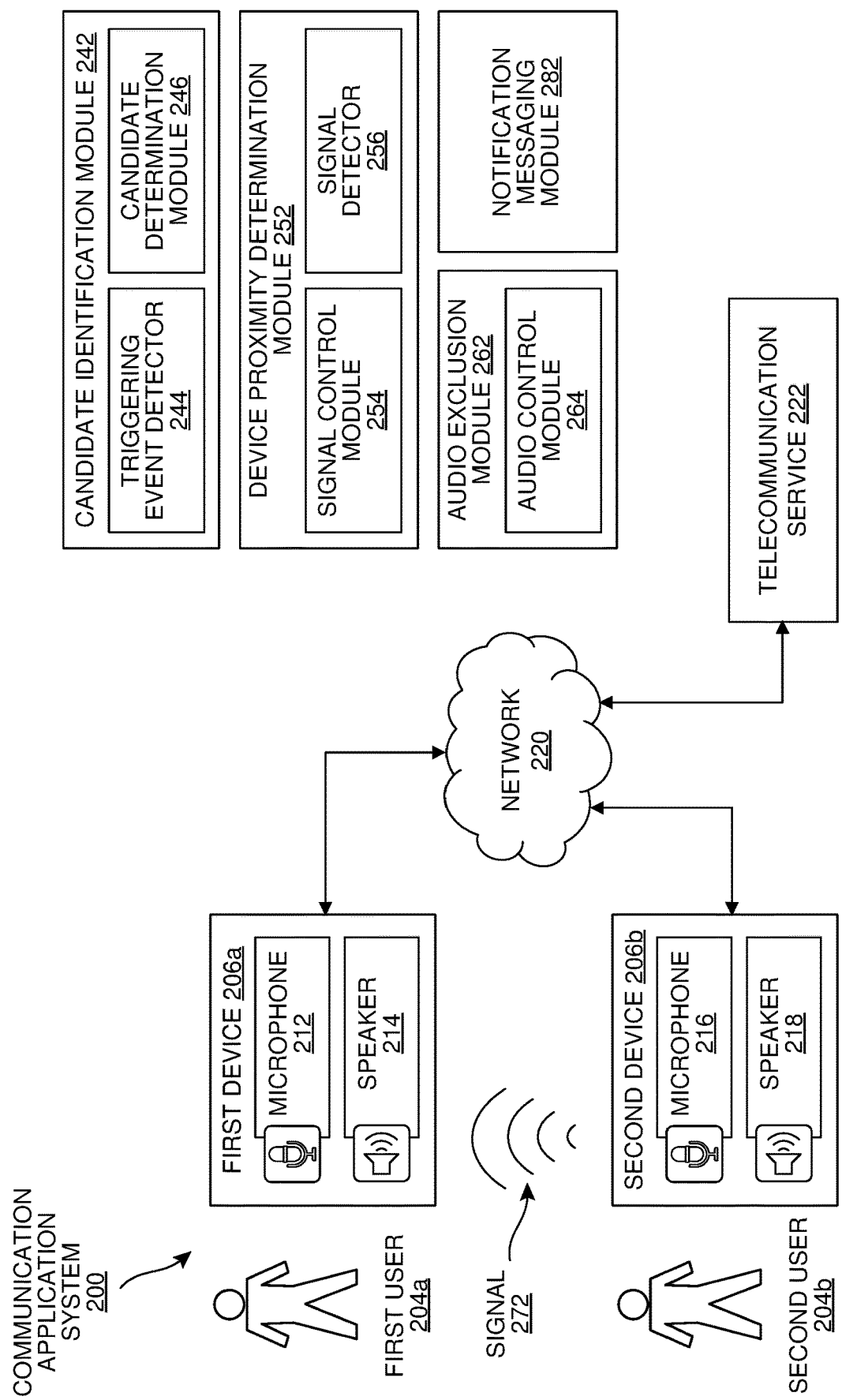
FIG. 2 illustrates a schematic example of a system including a plurality of devices and a communication application service configured to determine whether a device intends to join a communication session and automatically muting such a device if it is in proximity to a previously joined device.

For purposes of clarity, FIG. 2 illustrates a schematic example of an audio feedback reduction system ("system") 200 (which may be included in the communication application system described in connection with FIG. 1), operating in a processing environment configured to provide the services of a selective audio exclusion tool in a shared device receptivity environment ("device environment"). The device environment refers to an environment in which two or more computing device endpoints are able to connect as part of and/or through the system 200.

In the example illustrated in FIG. 2, there are two users (204a and 204b) who are each associated with a respective computing device (also referred to herein as device endpoints 206) in shared device receptivity environment. Such an environment may also be referred to herein as a shared receptivity device neighborhood ("device neighborhood") to underscore the close physical proximity of the devices to one another. In FIG. 2, a first user 204a is utilizing a first device 206a at a first workstation, and a second user 204b is utilizing a second device 206b at a second workstation. The two workstations, and accordingly the two devices 206a and 206b, are proximate to, or within auditory range of, each other. Each of the devices 206a and 206b may be included in the system 200.

Although only two user devices 206a and 206b are illustrated in FIG. 2, it is understood that system 200 may be adapted to interact with practically any number of communication sessions, devices, and users. Each device may be configured to allow use of one or more telecommunications services, and/or to execute software instructions configured to allow the user device to interact with processing environment. In some examples, a user device may be a user computing device suitable for executing software instructions, which may be included in one or more software applications, configured to allow the user device to interact with processing environment. Examples of user computing devices include, but are not limited to, a smartphone, a tablet computer, a smart watch, a wearable computer, a personal computer, a desktop computer, a gaming system, a laptop computer, and/or a virtual reality (VR) device.

The devices 206a and 206b may also be configured to communicate with one another and/or with processing environment over a network 220. Network(s) 220 includes one or more data communication networks allowing data to be communicated between various elements of the system 200, such as devices 206a and 206b, and/or the modules and elements included in the processing environment. Network(s) 220 may include, for example, the Internet, an internet service provider (ISP) connection, a local wired or wireless network (such as, but not limited to, Wi-Fi or Ethernet), a short range wireless network (such as, but not limited to, Bluetooth), and/or an internal network connecting two or more of the modules and elements included in the processing environment.

Thus, the devices 206a and 206b can be connected to the Internet and communicate over the Internet. However, it may be appreciated that the proposed systems can work without an Internet connection. For example, communication can take place over a local network, private network, ad-hoc network, or the like. A device can broadcast messages to other devices on the same network. An ad-hoc (which may be private) wireless network can be used to communicate even if there is no formal network in place. Devices can determine whether they are within a certain proximity of each other, and such technology can also be used to interconnect the devices.

A Wi-Fi Direct service (WiFiDS) can be used so that devices can communicate even if they are not on the same network, there is no network (e.g., in a public space), or the like. Simple Search and Discover Protocol (SSDP) can be used to detect devices on the same access point (e.g., same subnet). For example, such an approach can be used if a device does not meet the hardware, driver, and/or software prerequisites for WiFiDS. Near Field Communication (NFC) is typically employed through radio communication and can also be used. It is expected that other and future-developed technologies can be used to accomplish communication between and among the devices as described herein.

In the example of FIG. 2, each of the devices 206a and 206b include audio components such as a microphone and a speaker. The microphone and speaker can be an internal or integral part of the device or can be an external source (e.g., USB microphone or the like). In this example, the first device 206a includes a first microphone 212 and a first speaker 214, and the second device 206b includes a second microphone 216 and a second speaker 218. Furthermore, each device is configured to access a cloud-based telecommunication application service ("service") 222 included in the system 200. This service 222 and/or the system 200 can interact with and receive information from various information stores and sources associated with or native to each device, including but not limited to calendar applications, email and/or messaging applications, social networking applications, virtual day planners, and other meeting management and scheduling software.

As shown in FIG. 2, in different implementations, the service 222 can include a candidate identification module 242, a device proximity determination module 252, and an audio exclusion module 262. In various implementations, each of the candidate identification module 242, the device proximity determination module 252, and the audio exclusion module 262 may be implemented in whole or in part by any of the portions of the system 200, such as the service 222, the first device 206a, and/or the second device 206b. In order to ensure that audio feedback is prevented before a device even joins a communication session, the system 200 is configured to identify whether a device has a likelihood or potential of joining a particular meeting. This can be implemented via the candidate identification module 242, which includes a triggering event detector 244 and a candidate determination module 246.

As described in greater detail below (see FIGS. 4A-4C), the system 200 can be configured to classify specific operations, actions, conditions, and/or sequences of tasks (referred to herein as "triggering events") associated with a user and/or a device (such as, but not limited to, those executed by the device) as an indication that the user is preparing or intending to join a specific meeting via the device. Some non-limiting examples of triggering events include (a) access of a virtual invite for the meeting; (b) access of a calendar on which the meeting is scheduled; (c) access of a portal or communication application hosting the scheduled meeting; (d) access of an email in which the meeting details are provided; (e) powering on or waking of a device during the window of time in which the meeting is occurring, where the user has previously indicated he or she would be attending said meeting but has not yet joined from another device. It can be appreciated that the triggering event detector 244 is configured to identify a triggering event only if such an event occurs in a predefined window of time in relation to the scheduled session. In other words, access of a virtual meeting invite during the time in which the meeting is scheduled is a triggering event, while access of the same virtual meeting invite three hours prior to the scheduled start time—or anytime following the conclusion of the meeting—will not be deemed a triggering event. The window of time may also be extended to include a period leading up to and immediately before the start time of the meeting. For example, while access of a calendar 45 minutes prior to a meeting may not represent a triggering event, the same access occurring 15 minutes or less prior to the meeting may serve as a triggering event. This period of time can be modified by the user in some implementations.

In response to the detection of a triggering event by triggering event detector 244, the candidate determination module 246 can make a determination that the device is a potential participant of the upcoming or ongoing meeting. Once the device has been identified as a candidate device for a specific meeting, the system 200 can ascertain whether other devices have previously joined the same meeting, and are either currently participating in the ongoing meeting, or waiting in a virtual lobby for the meeting to begin and/or for the moderator to commence the session. If no other devices have yet joined, no further action will be taken at that time. The candidate device may transition past the joining stage and enter the meeting as the first active participant. However, if other devices have previously joined the meeting, the system 200 is configured to cause these participant devices to broadcast a signal via a signal control module 254 of device proximity determination module 252. Thus, in different implementations, the system 200 can cause the participant devices to initiate the generation of a signal 272 for the specified communication session. The signal 272, if received by one or more candidate devices, may be processed by a signal detector 256 of device proximity module 252, which will be used to determine if the candidate device is within reception range of the signal 272.

In other words, a signal can be output (e.g., inaudibly or audibly) from a first device endpoint already joined to the meeting. If this signal is received by a second device endpoint near to the first device endpoint, the second device endpoint will be understood to be in auditory range of the first device endpoint. In contrast, if the location of the second device endpoint is such that it is out of reception range and does not receive and/or register the input signal, the second device endpoint will not be further affected.

Once the system 200 has identified a candidate device and determined that the candidate device is in an auditory range of another (a proximate candidate device), already-joined (participant) device, the audio exclusion module 262 can initiate a muting operation via an audio control module 264. The audio control module 264 can cause (in some examples, by issuing a corresponding command) the proximate candidate device to preemptively exclude any audio that would otherwise have been collected or produced by the microphone(s) or speaker(s) associated with the candidate device.

Thus, as described herein, when nearby endpoint(s) are detected that might cause audio feedback, the device endpoint(s) can be controlled by the system 200 to mute one or more onboard or connected audio components such as a speaker or microphone. In some implementations, the device(s) can be muted from a remote component (which may be associated with the service 222). In addition, in some implementations, a notification can be provided to the device endpoint user to indicate that the mute operation has been applied (or will or should be applied to one or more of the collocated devices), via a notification messaging module 282 of system 200.

In the embodiments that follow in FIGS. 3-10, the reader may understand that the various features, properties, characteristics, configurations, and/or arrangements as described above with reference to FIG. 2 may be equally applicable to the following embodiments. Thus, for example, although a device or system included therein may not be specifically described below as including a feature, property, characteristic, configuration and/or arrangement, it may be appreciated that the details provided above with respect to FIG. 2 may be incorporated in any of the following embodiments of FIGS. 3-10.

Figure 3:
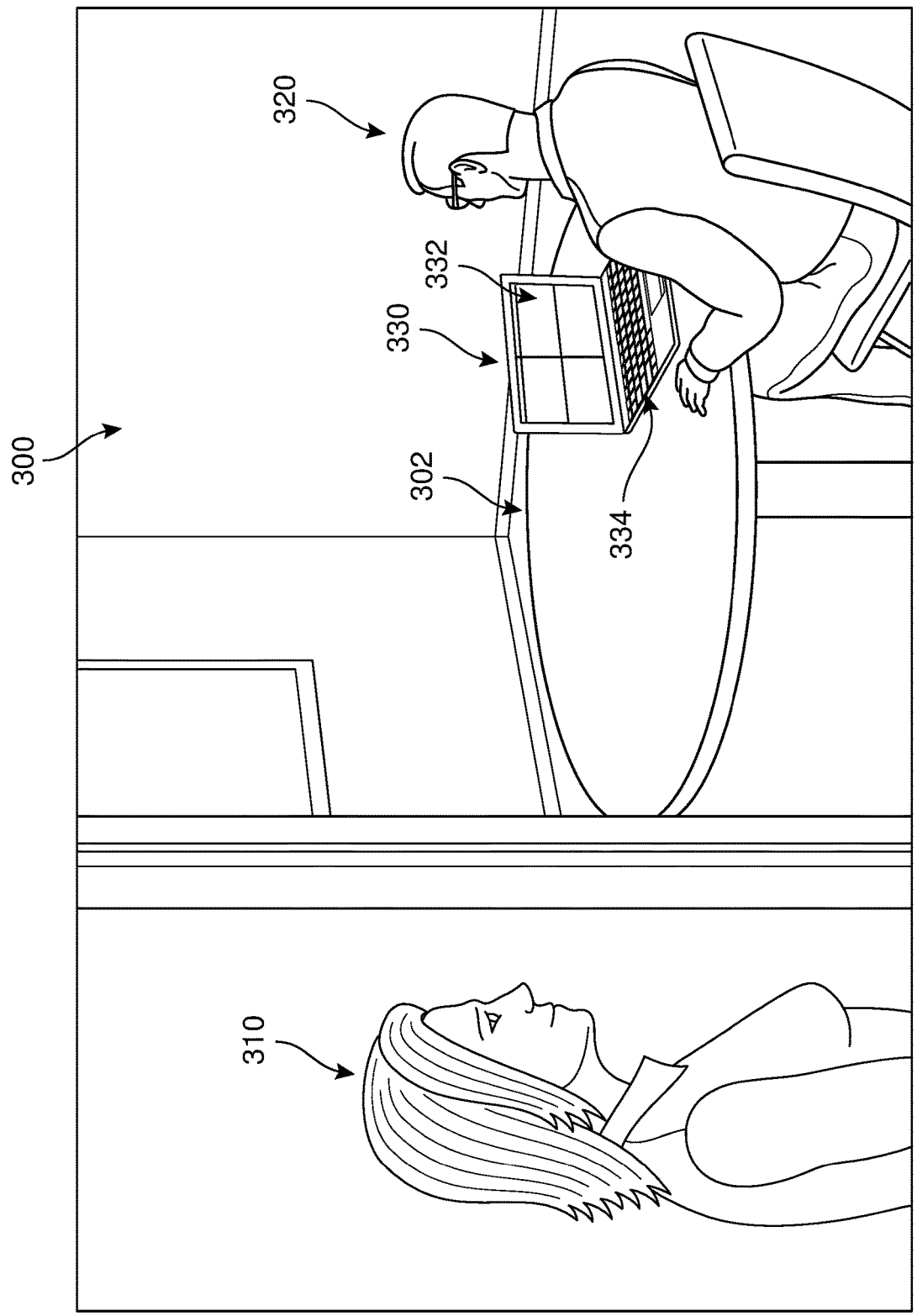
FIG. 3 illustrates an example scenario in which a first user is entering a shared space in which a second user is already working.

Referring now to FIG. 3, a tentative participant 310 of an ongoing communication session is depicted entering a shared space 300. The shared space 300 in this case is a conference room, but in other implementations, the shared space 300 can be any space in which a plurality of users is present with device endpoints that may be in auditory range of one another, including walled and open spaces, as well as indoor and outdoor spaces. A first session participant ("first participant") 320 is also shown in the shared space 300, seated at a conference table 302, facing a display of a first device endpoint ("first device") 330. The first device 330 is a participant device, having already connected (joined) to the ongoing communication session, here represented by a communication user interface 332 for a communication application. In addition, the first device 330 includes a first audio component 334.

In general, a user interface or "interface" can be understood to refer to a mechanism for communicating content through a client application to an application user. For example, interfaces may include pop-up windows that may be presented to a user via native application user interfaces (UIs), controls, actuatable interfaces, interactive buttons, or other objects that may be shown to a user through native application UIs, as well as mechanisms that are native to a particular application for presenting associated content with those native controls. Furthermore, an "actuation" or "actuation event" refers to an event (or specific sequence of events) associated with a particular input or use of an application via an interface, which can trigger a change in the display of the application. Similarly, a 'targeted' option or target option refers to the option that is current navigation destination, without the target having been actuated. In other words, when a user moves their selection tool or navigational indicator from a first option or location of the interface to another, second option or location, it can be understood that the current target has switched from the first option to the second option.

In addition, a "native control" refers to a mechanism for communicating content through a client application to an application user. For example, native controls may include actuatable or selectable options or "buttons" that may be presented to a user via native application UIs, touch-screen access points, menus items, or other virtual objects that may be shown to a user through native application UIs or segments of a larger interface, as well as mechanisms that are native to a particular application for presenting associated content with those native controls. The term "asset" refers to content that may be presented in association with a native control in a native application. Thus, as non-limiting examples, an asset may include text in an actuatable pop-up window, audio associated with the interactive click or selection of a button or other native application object, video associated with a user interface, or other such information presentation.

Figure 4A:
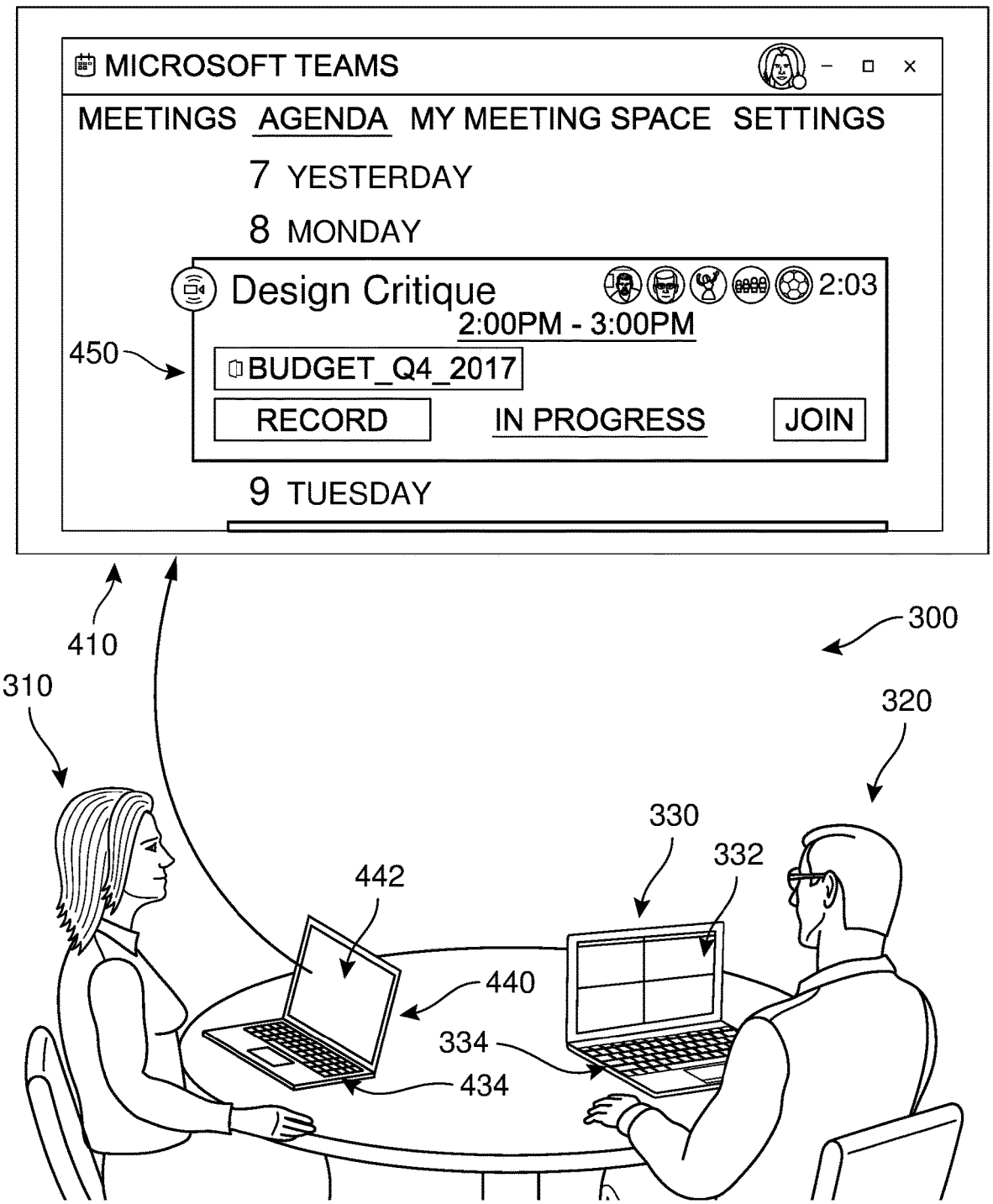
FIGS. 4A-4C illustrate three examples of triggering events that can indicate to a service that a user is intending to join a communication session via a device.
Figure 4B:
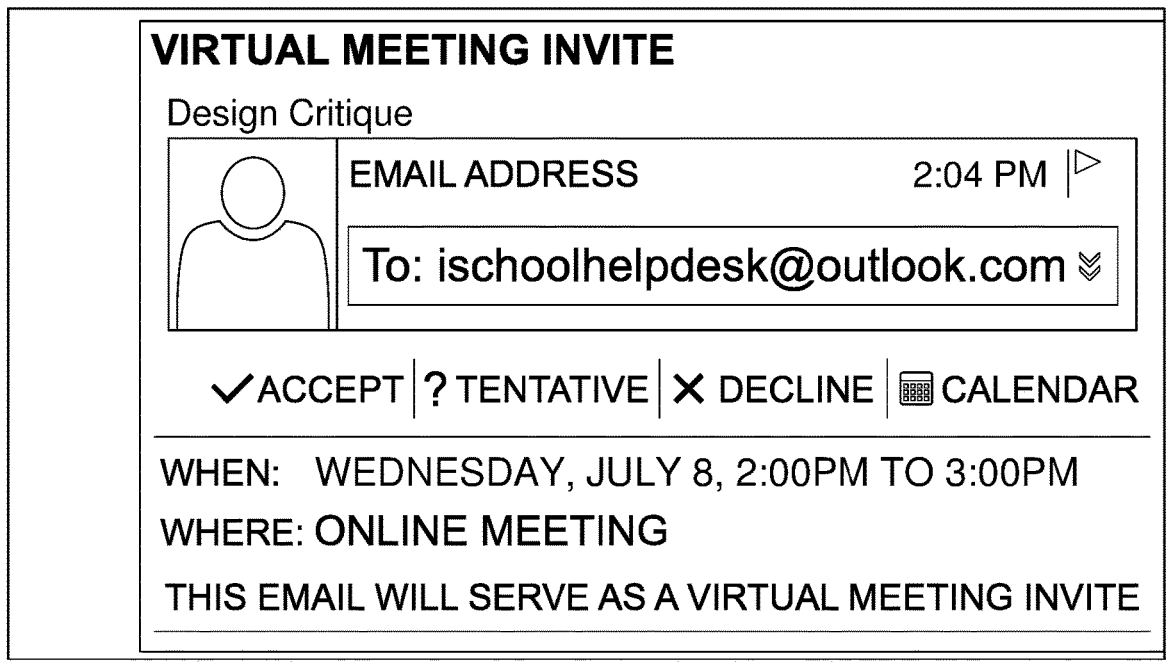
Figure 4B:
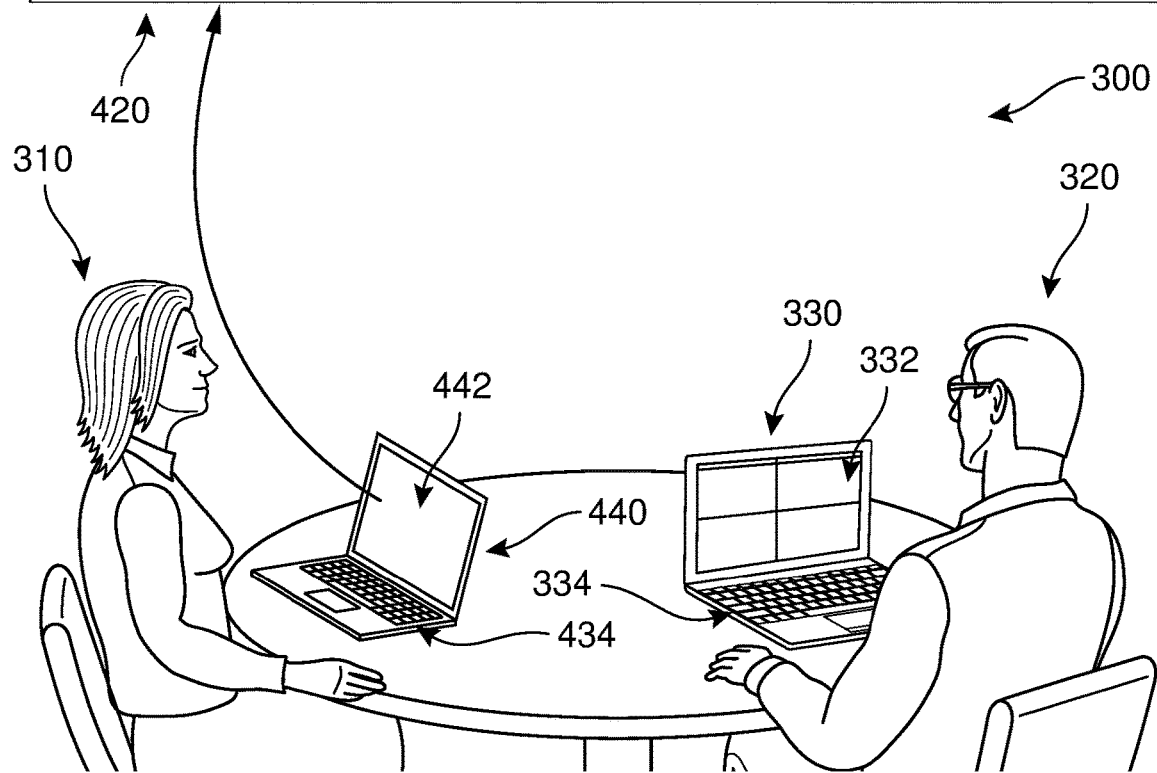
Figure 4C:
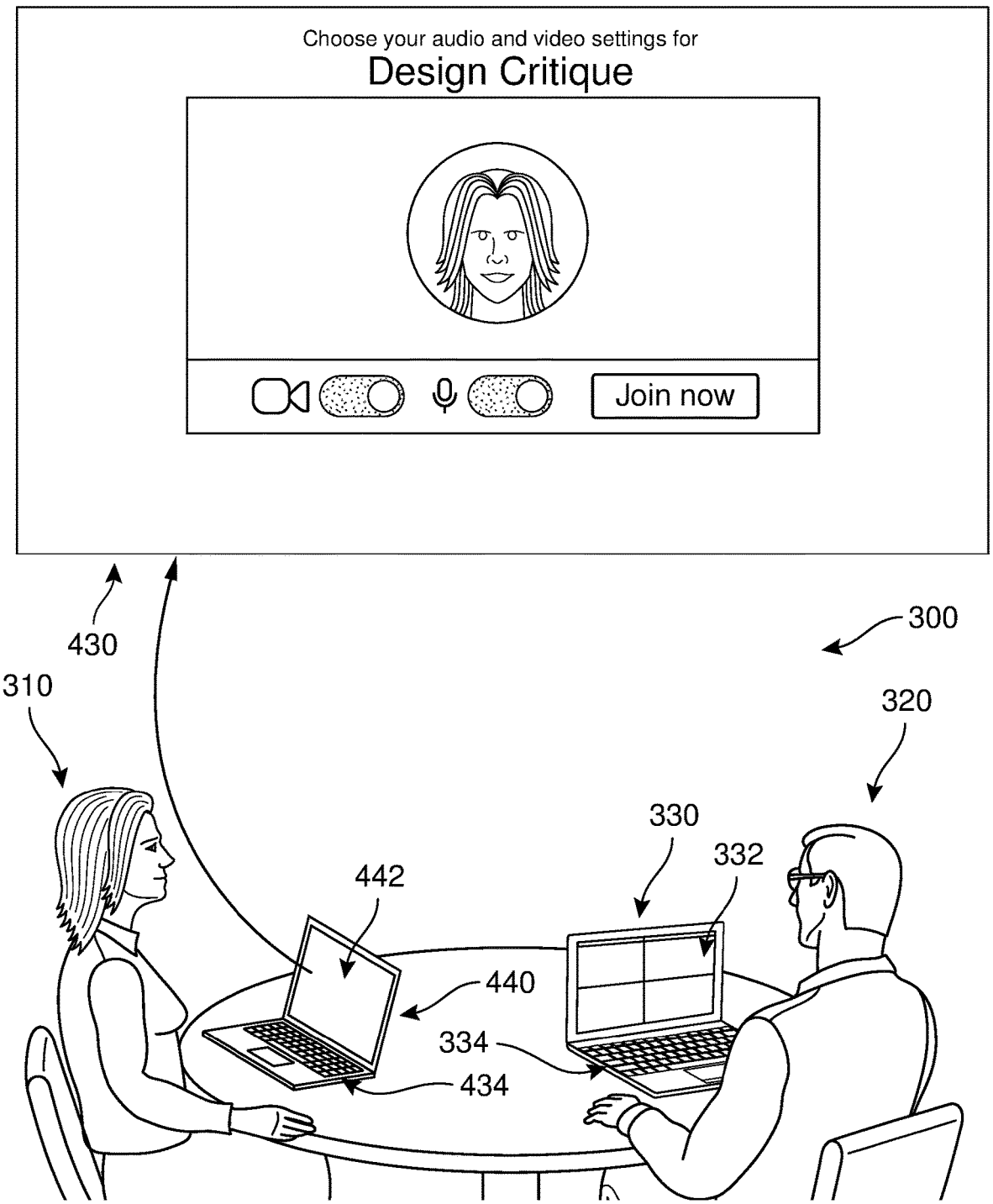

As noted earlier, in different implementations, the proposed systems can include provisions for determining whether a user is intending to join an upcoming or ongoing communication session. FIGS. 4A-4C present three examples of possible triggering event occurring in connection with a device endpoint. In response to a triggering event, the system may implement, activate, initiate, or enable an auditory range detection procedure, discussed above with respect to FIG. 2. As shown in FIGS. 4A-4C, once the tentative participant 310 is seated at the conference table 302, she proceeds to setup her own second device endpoint ("second device") 440, where second device 440 also includes a display 442 and at least a second audio component 434. In the first example illustrated in FIG. 4A, the tentative participant 310 has opened a communication application and accesses a calendar interface 410 in which a communication session indicator 450 is being presented, notifying the tentative participant 310 that a communication session ("Design Critique") which identifies her as a potential or actual invitee is currently ongoing ("in progress"). The access by the tentative participant 310 of the specific webpage or portal in which the calendar interface 410 including indicator 450 is displayed can provide an indication of an intention by the tentative participant 310 of participating in the session. The system can be configured to determine if such an access event occurs during a predefined window of time (i.e., during the scheduled meeting time and/or during a window of time prior to the start time of the meeting) and further be configured to interpret such an action as a triggering event. In response, the system can identify the second device 440 as a candidate device. In an alternate implementation, if a conference or other session is scheduled and included in a user's calendar, and the device is on and active (i.e., powered on and not asleep, hibernating, and/or in another low-power state), the system can automatically determine this is a candidate device at a preset amount of time prior to the start time of the session.

In the second example illustrated in FIG. 4B, the tentative participant 310 has accessed her email management client application to view a virtual meeting invite 420 that has been shared or emailed to her. The invite 420, having not been responded to yet, reflects the indeterminate status of the tentative participant 310 in the "Design Critique" meeting. However, because the tentative participant 310 is now accessing the invite 420 specifically during the scheduled meeting time, such access can also indicate an intention by the tentative participant 310 of participating in the session. The system can again be configured to determine if such an access event occurs during a predefined window of time (i.e., during the scheduled meeting time and/or during a window of time prior to the start time of the meeting) and further be configured to interpret such an action as a triggering event. In response, the system can identify the second device 440 as a candidate device. In some implementations, if a user has accepted a meeting invite but not yet joined, and is logged into the communication application client, the system can be configured to automatically identify the device endpoint as a candidate device.

In the third example illustrated in FIG. 4C, the tentative participant 310 is viewing a "join" window 430 for a communication application via which the communication session ("Design Critique") is being hosted. Thus, the window 430 includes information for the specific session, such as a conference ID or other connection properties. The window 430, being accessed specifically during the scheduled meeting time, can also represent a strong intention by the tentative participant 310 of participating in said session. The system can thus be configured to determine if such a pre-join-type event occurs during a predefined window of time (i.e., during the scheduled meeting time and/or during a window of time prior to the start time of the meeting) and further be configured to interpret such an action as a triggering event. In response, the system can identify the second device 440 as a candidate device.

It should be understood that the text and specific wording shown in the figures are for purposes of illustration only and in no way limit the manner by which a communication application may be configured to communicate or receive information. In addition, while some selectable options are illustrated herein in the various user interfaces, it should be understood that in other implementations, selectable options or other fields and options may appear differently and/or may be displayed or generated anywhere else on the screen(s) associated with the client's system, including spaced apart from, adjacent to, or around the scheduler user interfaces. In other words, the figures present only one possible layout of the interfaces, and do not in any way limit the presentation arrangement of any of the disclosed features.

Figure 5:
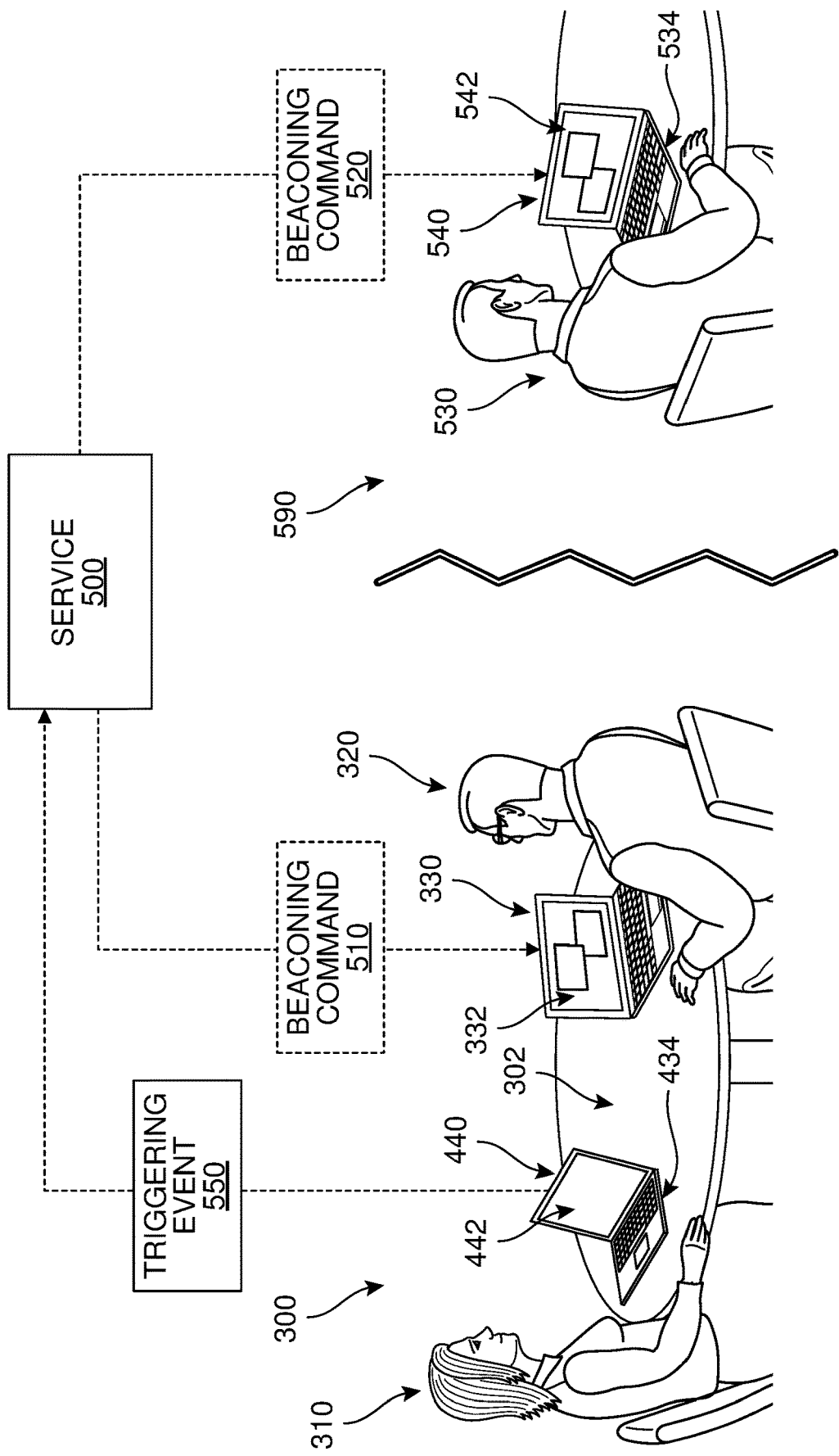
FIGS. 5 and 6 illustrate an example scenario in which a service causes participant devices to generate a beacon signal.

Once a candidate device has been identified, the system can include provisions for coordinating the audio environment(s) in which participant and candidate devices for a specific communication session are present. In FIG. 5, one example of such a mechanism is depicted. In FIG. 5, for purposes of illustration, an additional, third device endpoint ("third device") 540 is shown, setup for use by a second session participant ("second participant") 530 in a meeting room 590 that is in a location that is remote relative to both tentative participant 310 and first participant 320 at shared space 300. The third device 540 is a participant device, having already connected (joined) to the ongoing communication session, here represented by a communication user interface 542 for the communication application. In addition, the third device 540 includes at least a third audio component 534.

Furthermore, as shown in FIG. 5, the communication session in this example is facilitated by a communication application service ("service") 500, which can connect participant devices to one another during the scheduled meeting and manage various features and options offered by the communication application. In response to a detection of a triggering event 550 occurring at second device 440 (although in some examples, the triggering event 550, or a portion thereof, may occur outside of the second device 440), the system can be configured to determine (for example, at the second device 440 and/or the service 500) whether the second device 440 is a candidate device, as noted above. In some implementations, if, based at least on the detection of triggering event 550, the system determines the second device 440 is a candidate device, the system can respond by initiating a control command to participant devices (shown here as first device 330 and third device 540) to emit a signal. By way of example, as shown in FIG. 5, in some implementations the service 500 transmits a first beaconing command 510 to first device 330 and a second beaconing command 520 to third device 540. The two beaconing commands may be substantially similar or vary depending on the device type, configuration, settings, and location. In some implementations, a device may be configured to emit the signal without an explicit beaconing command; for example, a device may be configured to emit the signal throughout its use as a participant device in a session (in some examples, while the device is un-muted).

Figure 6:
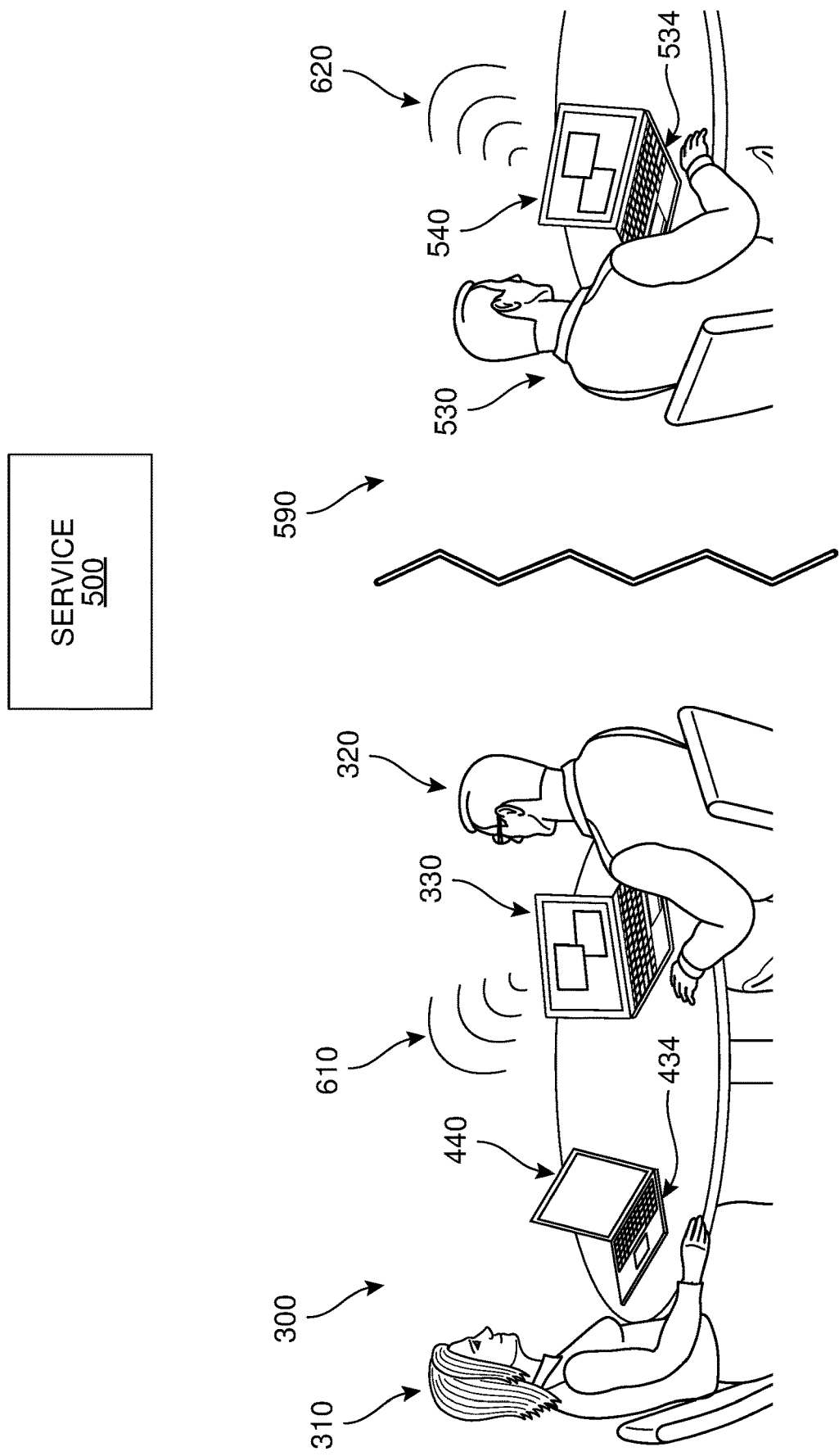

Referring now to FIG. 6, in different implementations, the first device 330 can be configured to generate or broadcast a first signal 610 (for example, in response to the first beaconing command 510). Similarly, the third device 540 can be configured to generate or broadcast a second signal 620 (for example, in response to the second beaconing command 520). Based on these types of inter-device transmissions or messages, the system can be configured to detect and identify a neighborhood of devices (i.e., devices that are proximate to one another). As shown in FIG. 6, the system can make a determination regarding the relative proximity of a candidate device to a participant device by the detection of the participant device's broadcast signal by the candidate device. Some non-limiting examples of signals that may be emitted by a participant device include Bluetooth-based signals (such as, but not limited to, according to the Bluetooth Low Energy (BLE) protocol) and ultrasonic-based tones, as well as other signal types which may be outside the range of human hearing.

In some implementations, these signals can also include a conference ID assigned to the conference or some other identifier. For example, a candidate device may receive Bluetooth data associated with unique Bluetooth 'beacon' signature(s) from a nearby (collocated) device endpoint that is already connected to the meeting. The beacon signal observed or received by a neighboring candidate device can be used by the system to determine that the candidate device is redundant with respect to required audio modalities for the meeting. In some implementations, a received signal strength threshold and/or a transmitted signal strength for the beacon signal is configurable to approximate an auditory range between the transmitting and receiving devices. In some cases, an ultrasonic tone can be played for several seconds through supported clients already in the meeting (participant devices) whenever a supported client is determined to be about to join a meeting (candidate devices). The ultrasonic tone detected during the pre-join stage can cause the system to issue a command to the candidate device to switch to an 'Audio Off' mode (e.g., mute communication application microphone and speaker stream). In some other examples, the candidate device(s) can play an audible join tone during the joining stage. If another nearby participant device's microphone feeds this tone into the meeting audio, then the system detects the tone and can be configured to send a message to any candidate devices that are joining the meeting to automatically mute the microphone and speakers.

In some implementations, the communication application client running on the device endpoint can cause each candidate device to activate a function to detect if the device has received a beacon signal embedded with the conference ID assigned to the conference. Thus, if the beacon signal is received, the system can interpret such receipt as an indication that the candidate device is at the same location or in an auditory range or proximity of another device endpoint already participating in the conference. In response, the communication application client on those subsequently joining devices can cause the devices to turn off their audio streams (e.g., microphone and/or speakers) to avoid audio feedback. However, if a beacon signal with the correct conference ID is not received, it is understood that there is no existing device in auditory range that is already participating in the conference. In this case, the communication application client on a candidate device will not exclude the audio streams for any audio components associated with the device. Instead, the candidate device will become a participant device that can itself become a source of a beacon signal that may be emitted for the benefit of subsequently joining candidate devices.

It can be appreciated that in different implementations, the proximity of two or more devices can be determined based on alternate or additional or supplemental data, such in cases where the system detects that there are multiple devices using the same subnet, and in response can cause one or more of those devices on the same subnet to be mute.

Figure 7:
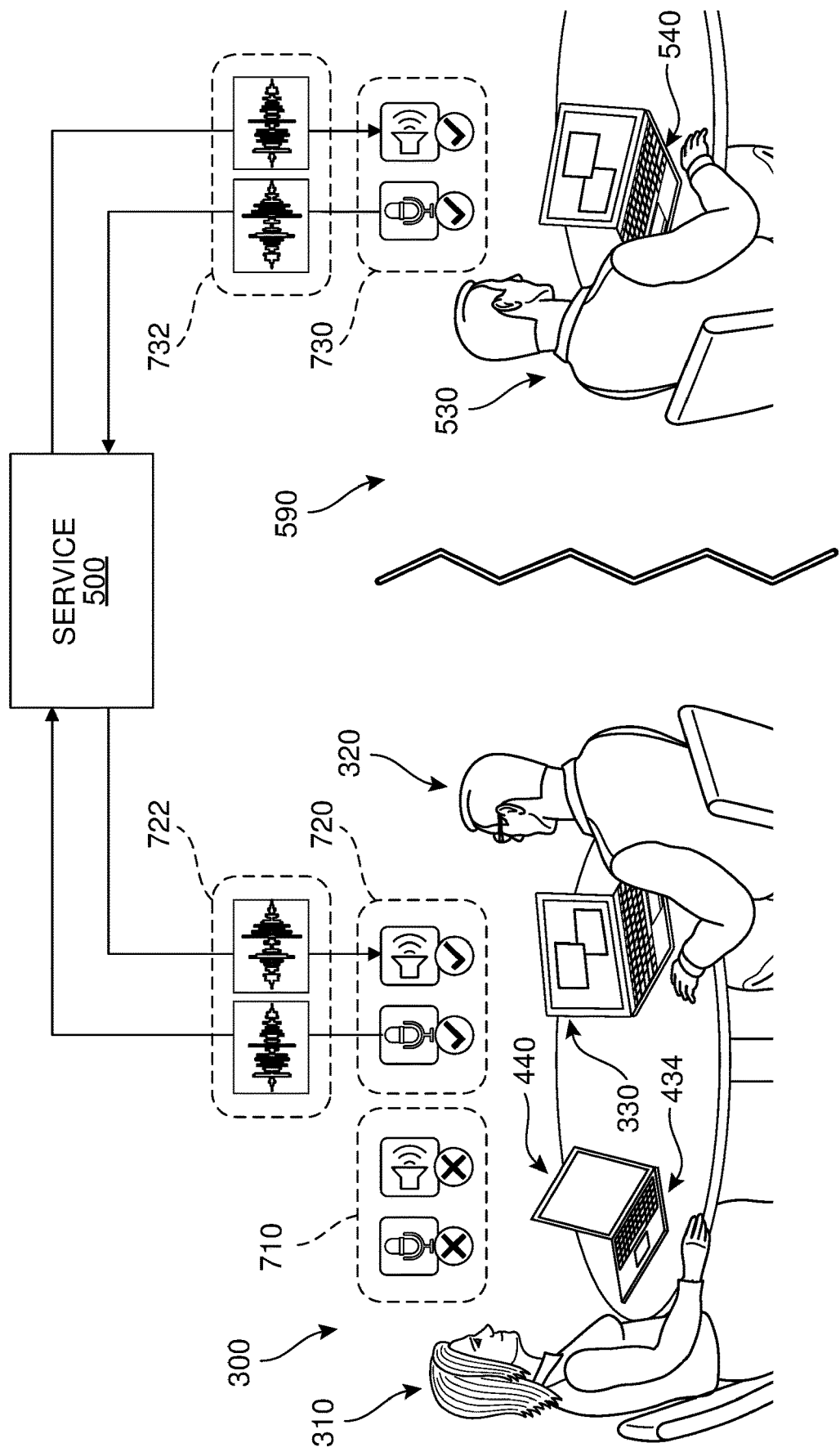
FIG. 7 illustrates an example scenario in which the service has preemptively muted a candidate device prior to the candidate device's join the communication session.

In response to a determination that the candidate device is near enough to at least one of the signal-generating participant device(s), the system can automatically cause the candidate device to block, disable, or otherwise exclude from the communication session the audio streams from one or more audio components associated with the candidate device. One example of this mechanism is illustrated in FIG. 7, where it can be observed that—during the meeting—although there are three participants, each with their own device, only audio components of two of the devices are being used, while the remaining device has been muted. Specifically, in FIG. 7, in the shared space 300, audio components 720 of first device 330 are fully enabled and streaming audio 722 to and from the meeting via service 500, while collocated second device 440 has been muted, thereby excluding any audio from associated audio components 710 from being shared with other participants in the meeting. At remote meeting room 590, audio components 730 of third device 540 (the sole device endpoint participating in the session at that location) are also fully enabled and streaming audio 732 to and from the meeting via service 500.

Figure 8:
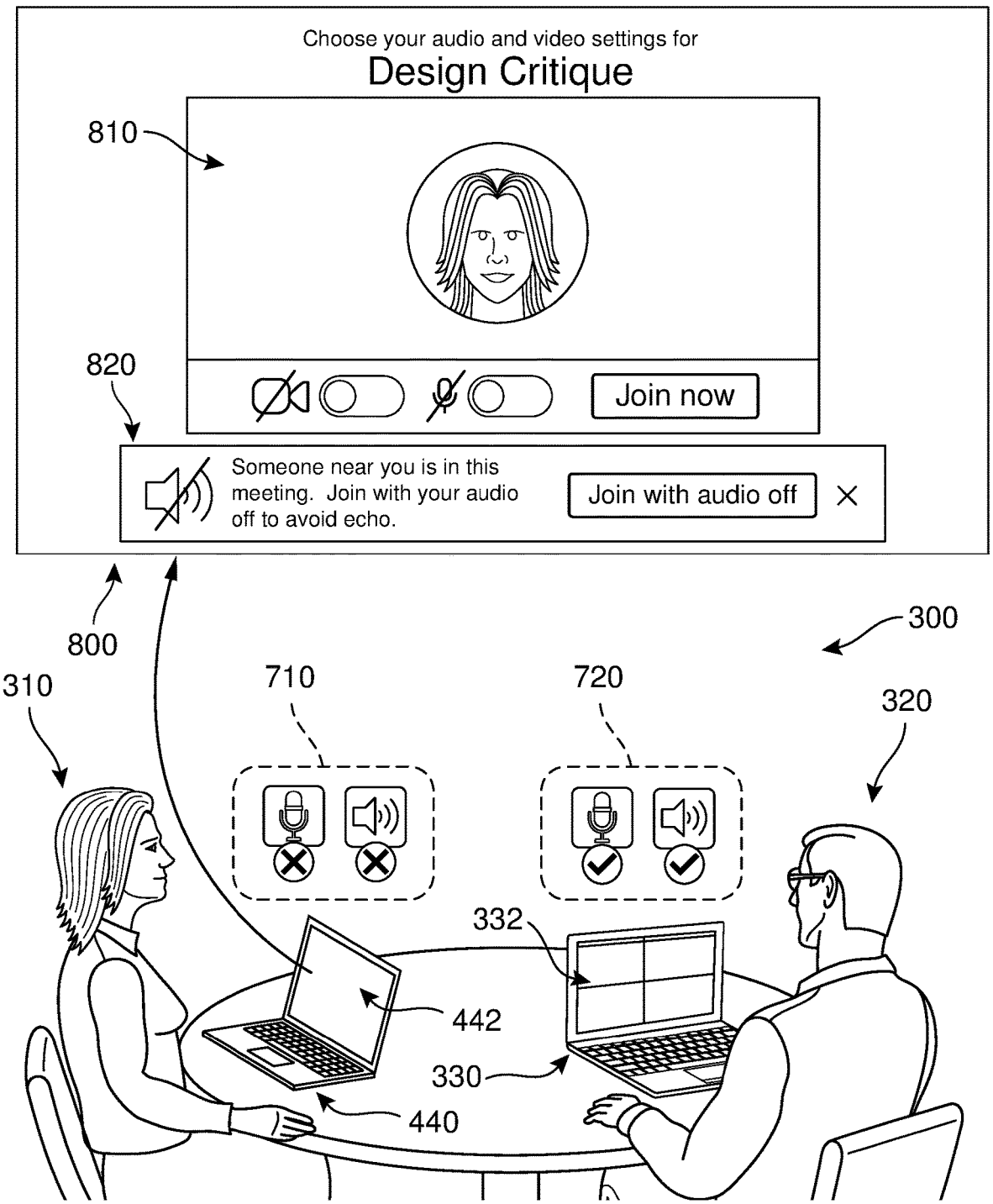
FIG. 8 illustrates an example scenario in which the candidate device is muted as the candidate device joins the communication session.

This is further reflected by FIG. 8, where an example of a virtual lobby interface 800 for the communication application is being presented to the tentative participant 310 on her display 442. The virtual lobby interface 800 includes a pre-join settings panel 810 that can include selectable options for allowing the user to select or modify audio and video settings. In addition, in some implementations, a notification 820 can also be presented indicating that the system has automatically muted or disabled the device audio. The notification 820 can serve to reinforce the context and/or reasons for proceeding to the Join Now stage without altering the muted settings ("Someone near you is in this meeting. Join with your audio off to avoid echo.") The tentative participant 310 can then proceed with joining the meeting and ensuring audio streams associated with her device are precluded from the conversation, thereby reducing the likelihood of any audio feedback.

Figure 9A:
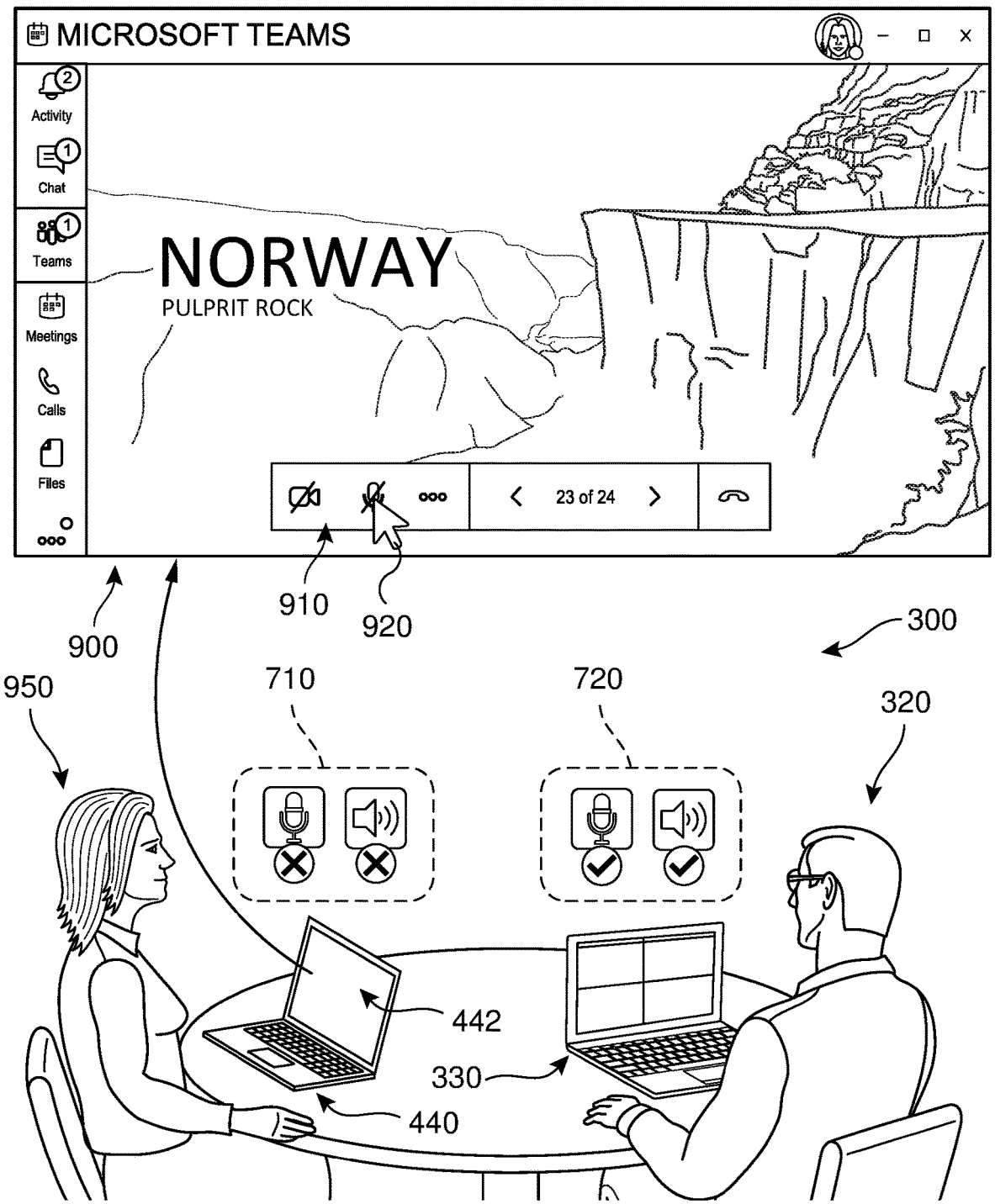
FIGS. 9A and 9B illustrate an example of a notification message that may be presented to a user attempting to un-mute a device.
Figure 9B:
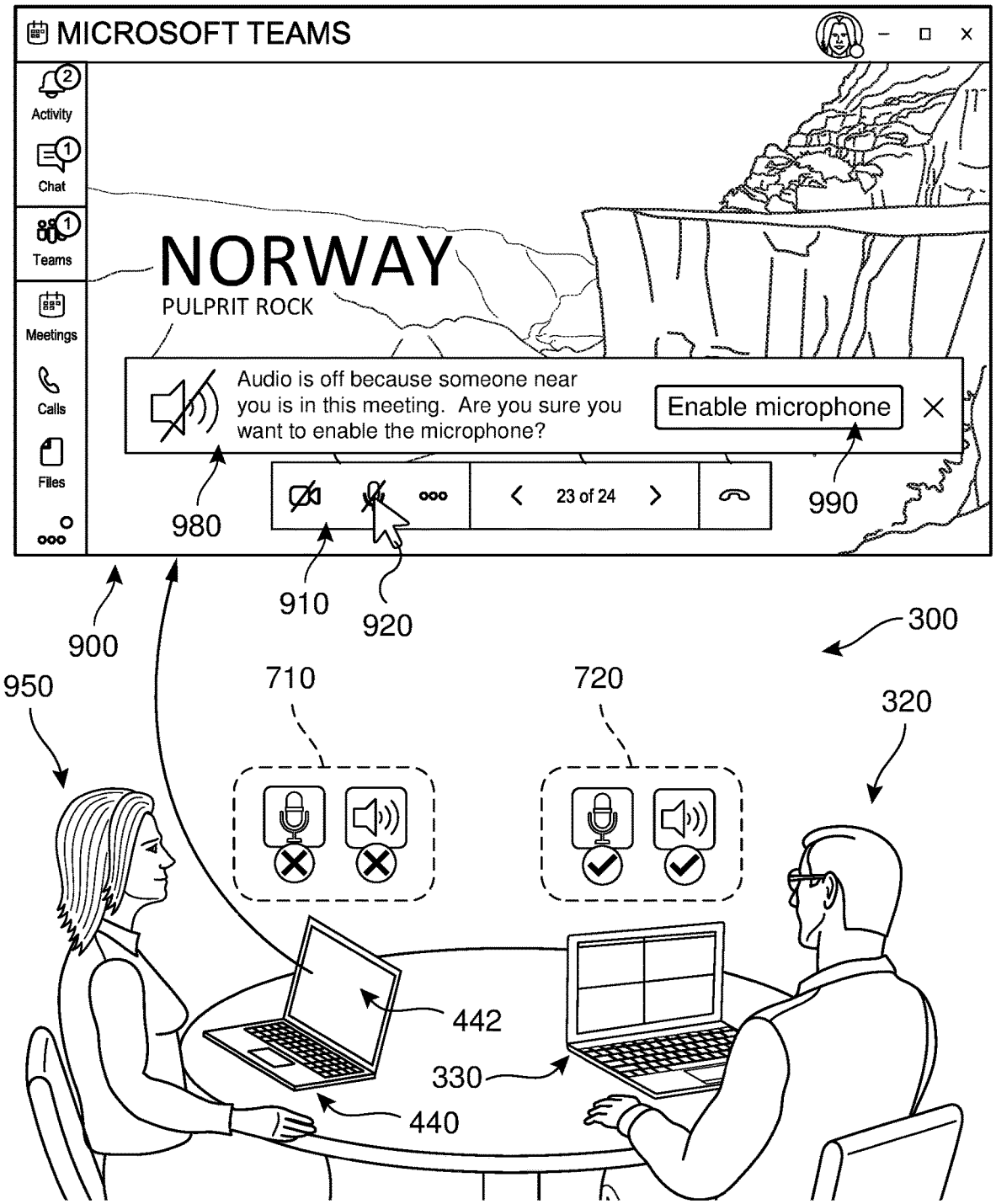

For purposes of clarity, FIGS. 9A and 9B illustrate an additional implementation of the proposed system. In FIG. 9A, the tentative participant is now an active participant 950, having joined the in-progress communication session. Because active participant 950 was determined to be within an auditory range of first participant 320, she is able to rely on the audio streams of first device 330 during the session. In other words, the microphone of first device 330 will convey the speech of both first participant 320 and active participant 950 to the meeting, and the speaker of first device 330 will produce sound for both first participant 320 and active participant 950 to hear.

In some cases, a participant may not recall or have been aware of the automated exclusion of her audio component(s) from the meeting. In FIG. 9A, the active participant 950 has moved her mouse cursor 920 toward the 'un-mute' option being shown on a toolbar 910 of communication application presentation window 900, via which media and other information may be shared among the participants. In response, in some implementations, the system can be configured to alert the participant of the significance of the current mute status for the device. In FIG. 9B, an alert window 980 is presented in response to the active participant's attempt to re-enable her audio component activity in the session. The alert window 980 notifies the active participant 950 that her audio has been excluded intentionally ("Audio is off because someone near you in in this meeting. Are you sure you want to enable the microphone?"), thereby ensuring the active participant 950 is aware of the basis on which the microphone had been previously muted, and requiring that she now make a more conscious decision to un-mute before proceeding to include the audio stream from her microphone in the meeting. In some implementations, a similar notification and confirmation process may also be presented in response to an attempt to un-mute the speakers for second device 440.

Figure 10:
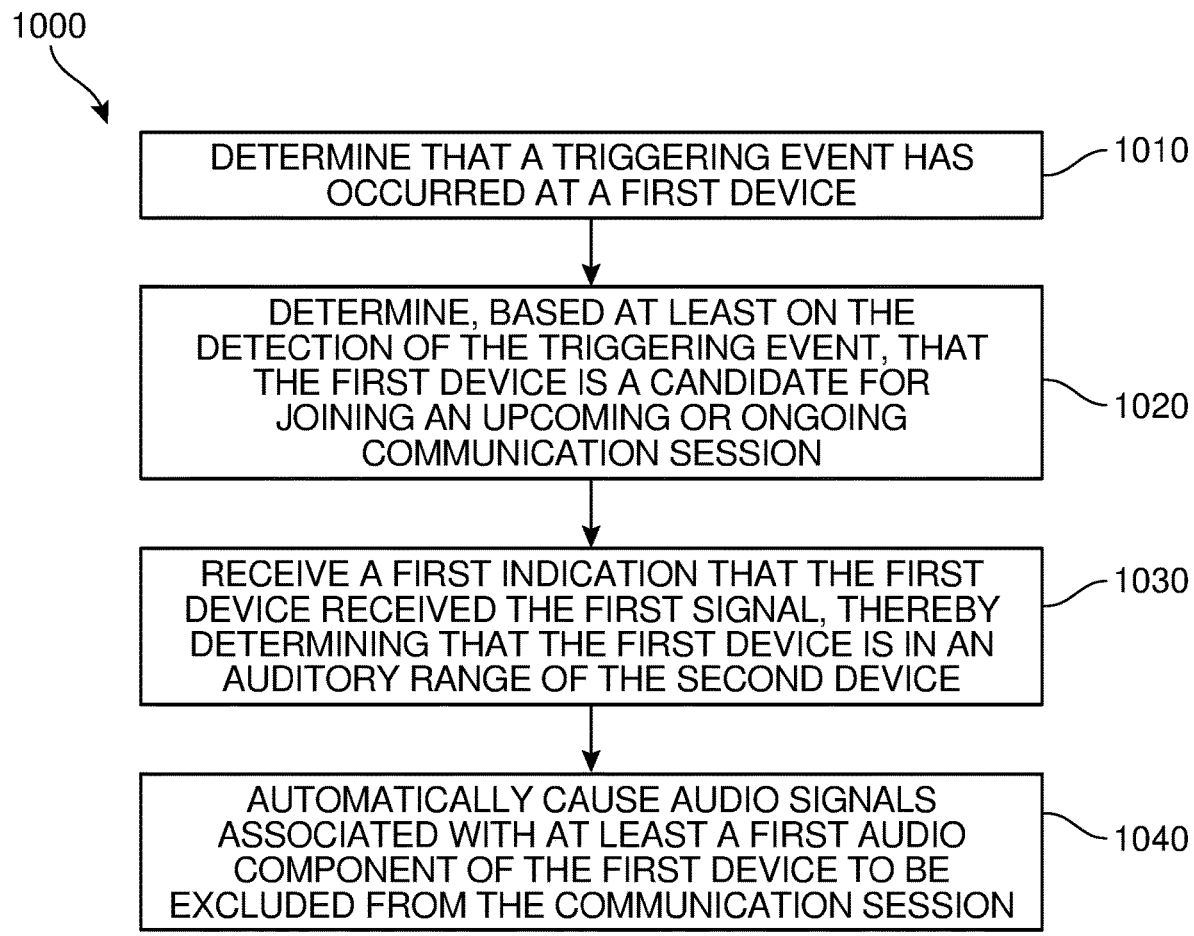
FIG. 10 is a flow chart illustrating a method of reducing audio feedback.

Referring now to FIG. 10, a flow chart depicting a method 1000 of reducing audio feedback is provided. As shown in FIG. 10, the method includes a first step 1010 of determining that a triggering event has occurred at a first device, and a second step 1020 of determining, based at least on the detection of the triggering event, that the first device is a candidate for joining an upcoming or ongoing communication session. A third step 1030 includes automatically causing a second device to broadcast a first signal, the second device being joined to the communication session, and a fourth step 1040 includes receiving a first indication that the first device received the first signal, thereby determining that the first device is in an auditory range of the second device. In addition, a fifth step 1050 includes automatically causing audio signals associated with at least a first audio component of the first device to be excluded from the communication session.

In different implementations, the method can include alternate or additional steps and aspects. For example, in some implementations, the first audio component includes a microphone, while in other implementations, the first audio component includes a speaker. In another example, the triggering event must occur during a predefined window of time leading up to a start time of the communication session or during the scheduled duration of the communication session. In some implementations, the triggering event refers to one of access of a calendar invite for the communication session, launch of a communication application hosting the communication session, navigation to a webpage presenting an option to join the communication session, and selection of the option to join the communication session.

In some other examples, the method may also include causing the first device to present, on a display of the first device, a user interface notifying a user of the first device of the automatic disablement of the at least first audio component. In some cases, the user interface includes a selectable option for re-enabling the at least first audio component. In one example, the first signal includes an ultrasonic-based signal, while in another example the first signal includes a Bluetooth-based signal. In some implementations, an identification code associated with the communication session is embedded in the first signal.

The detailed examples of systems, devices, and techniques described in connection with FIGS. 1-10 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-10 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 11:
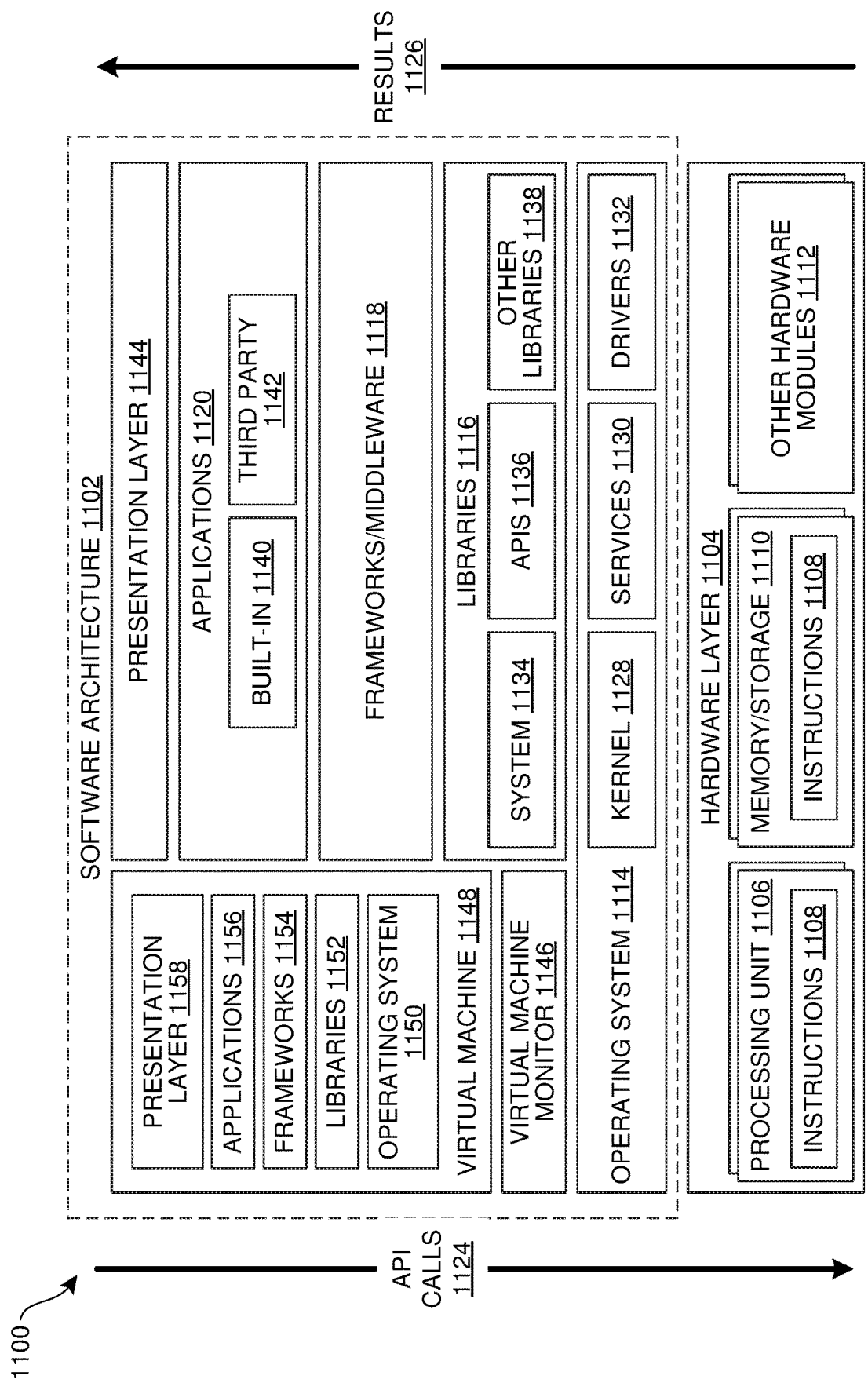
FIG. 11 is a block diagram illustrating an example software architecture, various portions of which may be used in conjunction with various hardware architectures herein described, which may implement any of the features herein described.

FIG. 11 is a block diagram 1100 illustrating an example software architecture 1102, various portions of which may be used in conjunction with various hardware architectures herein described, which may implement any of the above-described features. FIG. 11 is a non-limiting example of a software architecture and it will be appreciated that many other architectures may be implemented to facilitate the functionality described herein. The software architecture 1102 may execute on hardware that includes, among other things, document storage 1270, processors, memory, and input/output (I/O) components. A representative hardware layer 1104 is illustrated and can represent, for example, the devices of FIGS. 1A and 1B. The representative hardware layer 1104 includes a processing unit 1106 and associated executable instructions 1108. The executable instructions 1108 represent executable instructions of the software architecture 1102, including implementation of the methods, modules and so forth described herein. The hardware layer 1104 also includes a memory/storage 1110, which also includes the executable instructions 1108 and accompanying data. The hardware layer 1104 may also include other hardware modules 1112. Instructions 1108 held by processing unit 1108 may be portions of instructions 1108 held by the memory/storage 1110.

The example software architecture 1102 may be conceptualized as layers, each providing various functionality. For example, the software architecture 1102 may include layers and components such as an operating system (OS) 1114, libraries 1116, frameworks 1118, applications 1120, and a presentation layer 1144. Operationally, the applications 1120 and/or other components within the layers may invoke API calls 1124 to other layers and receive corresponding results 1126. The layers illustrated are representative in nature and other software architectures may include additional or different layers. For example, some mobile or special purpose operating systems may not provide the frameworks/middleware 1118.

The OS 1114 may manage hardware resources and provide common services. The OS 1114 may include, for example, a kernel 1128, services 1130, and drivers 1132. The kernel 1128 may act as an abstraction layer between the hardware layer 1104 and other software layers. For example, the kernel 1128 may be responsible for memory management, processor management (for example, scheduling), component management, networking, security settings, and so on. The services 1130 may provide other common services for the other software layers. The drivers 1132 may be responsible for controlling or interfacing with the underlying hardware layer 1104. For instance, the drivers 1132 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1116 may provide a common infrastructure that may be used by the applications 1120 and/or other components and/or layers. The libraries 1116 typically provide functionality for use by other software modules to perform tasks, rather than rather than interacting directly with the OS 1114. The libraries 1116 may include system libraries 1134 (for example, C standard library) that may provide functions such as memory allocation, string manipulation, file operations. In addition, the libraries 1116 may include API libraries 1136 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1116 may also include a wide variety of other libraries 1138 to provide many functions for applications 1120 and other software modules.

The frameworks 1118 (also sometimes referred to as middleware) provide a higher-level common infrastructure that may be used by the applications 1120 and/or other software modules. For example, the frameworks 1118 may provide various graphic user interface (GUI) functions, high-level resource management, or high-level location services. The frameworks 1118 may provide a broad spectrum of other APIs for applications 1120 and/or other software modules.

The applications 1120 include built-in applications 1140 and/or third-party applications 1142. Examples of built-in applications 1140 may include, but are not limited to, a contacts application, a browser application, a location application, a media application, a messaging application, and/or a game application. Third-party applications 1142 may include any applications developed by an entity other than the vendor of the particular platform. The applications 1120 may use functions available via OS 1114, libraries 1116, frameworks 1118, and presentation layer 1144 to create user interfaces to interact with users.

Some software architectures use virtual machines, as illustrated by a virtual machine 1148. The virtual machine 1148 provides an execution environment where applications/modules can execute as if they were executing on a hardware machine. The virtual machine 1148 may be hosted by a host OS (for example, OS 1114) or hypervisor, and may have a virtual machine monitor 1146 which manages operation of the virtual machine 1148 and interoperation with the host operating system. A software architecture, which may be different from software architecture 1102 outside of the virtual machine, executes within the virtual machine 1148 such as an OS 1150, libraries 1152, frameworks 1154, applications 1156, and/or a presentation layer 1158.

Figure 12:
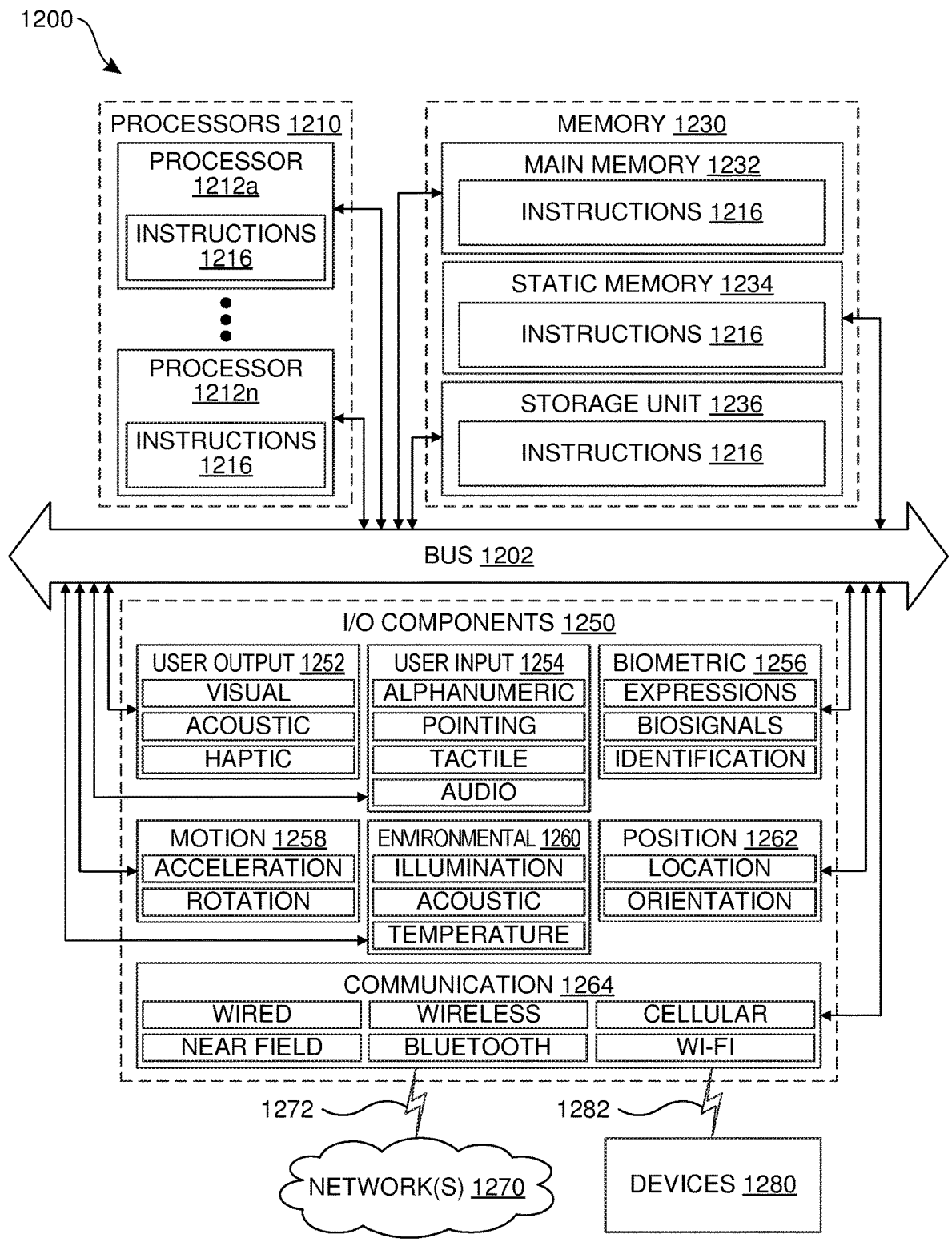
FIG. 12 is a block diagram illustrating components of an example machine configured to read instructions from a machine-readable medium and perform any of the features described herein.

FIG. 12 is a block diagram illustrating components of an example machine 1200 configured to read instructions from a machine-readable medium (for example, a machine-readable storage medium) and perform any of the features described herein. The example machine 1200 is in a form of a computer system, within which instructions 1216 (for example, in the form of software components) for causing the machine 1200 to perform any of the features described herein may be executed. As such, the instructions 1216 may be used to implement modules or components described herein. The instructions 1216 cause unprogrammed and/or unconfigured machine 1200 to operate as a particular machine configured to carry out the described features. The machine 1200 may be configured to operate as a standalone device or may be coupled (for example, networked) to other machines. In a networked deployment, the machine 1200 may operate in the capacity of a server machine or a client machine in a server-client network environment, or as a node in a peer-to-peer or distributed network environment. Machine 1200 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1200 is illustrated, the term "machine" includes a collection of machines that individually or jointly execute the instructions 1216.

The machine 1200 may include processors 1210, memory 1230, and I/O components 1250, which may be communicatively coupled via, for example, a bus 1202. The bus 1202 may include multiple buses coupling various elements of machine 1200 via various bus technologies and protocols. In an example, the processors 1210 (including, for example, a central processing unit (CPU), a graphics processing unit (GPU), a digital signal processor (DSP), an ASIC, or a suitable combination thereof) may include one or more processors 1212a to 1212n that may execute the instructions 1216 and process data. In some examples, one or more processors 1210 may execute instructions provided or identified by one or more other processors 1210. The term "processor" includes a multi-core processor including cores that may execute instructions contemporaneously. Although FIG. 12 shows multiple processors, the machine 1200 may include a single processor with a single core, a single processor with multiple cores (for example, a multi-core processor), multiple processors each with a single core, multiple processors each with multiple cores, or any combination thereof. In some examples, the machine 1200 may include multiple processors distributed among multiple machines.

The memory/storage 1230 may include a main memory 1232, a static memory 1234, or other memory, and a storage unit 1236, both accessible to the processors 1210 such as via the bus 1202. The storage unit 1236 and memory 1232, 1234 store instructions 1216 embodying any one or more of the functions described herein. The memory/storage 1230 may also store temporary, intermediate, and/or long-term data for processors 1210. The instructions 1216 may also reside, completely or partially, within the memory 1232, 1234, within the storage unit 1236, within at least one of the processors 1210 (for example, within a command buffer or cache memory), within memory at least one of I/O components 1250, or any suitable combination thereof, during execution thereof. Accordingly, the memory 1232, 1234, the storage unit 1236, memory in processors 1210, and memory in I/O components 1250 are examples of machine-readable media.

As used herein, "machine-readable medium" refers to a device able to temporarily or permanently store instructions and data that cause machine 1200 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1216) for execution by a machine 1200 such that the instructions, when executed by one or more processors 1210 of the machine 1200, cause the machine 1200 to perform and one or more of the features described herein. Accordingly, a "machine-readable medium" may refer to a single storage device, as well as "cloud-based" storage systems or storage networks that include multiple storage apparatus or devices.

The I/O components 1250 may include a wide variety of hardware components adapted to receive input, provide output, produce output, transmit information, exchange information, capture measurements, and so on. The specific I/O components 1250 included in a particular machine will depend on the type and/or function of the machine. For example, mobile devices such as mobile phones may include a touch input device, whereas a headless server or IoT device may not include such a touch input device. The particular examples of I/O components illustrated in FIG. 12 are in no way limiting, and other types of components may be included in machine 1200. The grouping of I/O components 1250 are merely for simplifying this discussion, and the grouping is in no way limiting. In various examples, the I/O components 1250 may include user output components 1252 and user input components 1254. User output components 1252 may include, for example, display components for displaying information (for example, a liquid crystal display (LCD) or a projector), acoustic components (for example, speakers), haptic components (for example, a vibratory motor or force-feedback device), and/or other signal generators. User input components 1254 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1250 may include biometric components 1256 and/or position components 1262, among a wide array of other environmental sensor components. The biometric components 1256 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1262 may include, for example, location sensors (for example, a Global Position System (GPS) receiver), altitude sensors (for example, an air pressure sensor from which altitude may be derived), and/or orientation sensors (for example, magnetometers).

The I/O components 1250 may include communication components 1264, implementing a wide variety of technologies operable to couple the machine 1200 to network(s) 1270 and/or device(s) 1280 via respective communicative couplings 1272 and 1282. The communication components 1264 may include one or more network interface components or other suitable devices to interface with the network(s) 1270. The communication components 1264 may include, for example, components adapted to provide wired communication, wireless communication, cellular communication, Near Field Communication (NFC), Bluetooth communication, Wi-Fi, and/or communication via other modalities. The device(s) 1280 may include other machines or various peripheral devices (for example, coupled via USB).

In some examples, the communication components 1264 may detect identifiers or include components adapted to detect identifiers. For example, the communication components 1264 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1262, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for reducing audio feedback comprising:
   one or more processors; and
   one or more machine-readable media including instructions stored therein which, when executed by the one or more processors, cause the system to:
      detect that a triggering event has occurred in connection with a first device;
      determine, based at least on detection of the triggering event, that the first device is a candidate for joining an upcoming or ongoing communication session;
      receive a first indication that the first device received a first signal, thereby determining that the first device is in an auditory range of a second device; and
      automatically cause audio signals associated with at least a first audio component of the first device to be excluded from the communication session.

2. The system of claim 1, wherein the instructions further cause the system to automatically cause the second device to broadcast the first signal, the second device being joined to the communication session.

3. The system of claim 1, wherein the first audio component includes a microphone or a speaker.

4. The system of claim 1, wherein the instructions further cause the system to cause the first device to present, on a display of the first device, a user interface notifying an end-user of the first device of an automatic disablement of the at least first audio component.

5. The system of claim 4, wherein the user interface includes a selectable option for re-enabling the at least first audio component.

6. The system of claim 1, wherein the triggering event must occur during a predefined window of time leading up to a start time of the communication session or during a scheduled duration of the communication session.

7. The system of claim 6, wherein the triggering event is one of an access of a calendar invite for the communication session, a launch of a communication application hosting the communication session, a navigation to a webpage presenting an option to join the communication session, and a selection of the option to join the communication session.

8. The system of claim 1, wherein the first signal includes an ultrasonic-based signal or a Bluetooth-based signal.

9. The system of claim 1, wherein the instructions further cause the system to:
   receive, at the first device, a request to re-enable the first audio component; and
   in response to receiving the request, present a notification indicating the first audio component was intentionally disabled and request a confirmation of requested re-enabling of the first audio component.

10. The system of claim 1, wherein an identification code associated with the communication session is embedded in the first signal.

11. A method of reducing audio feedback, the method comprising:
   detecting that a triggering event has occurred in connection with a first device;
   determining, based at least on detection of the triggering event, that the first device is a candidate for joining an upcoming or ongoing communication session;
   receiving a first indication that the first device received a first signal, thereby determining that the first device is in an auditory range of a second device; and
   automatically causing audio signals associated with at least a first audio component of the first device to be excluded from the communication session.

12. The method of claim 11, further comprising automatically causing the second device to broadcast the first signal, the second device being joined to the communication session.

13. The method of claim 11, wherein the first audio component includes a microphone or a speaker.

14. The method of claim 11, further comprising causing the first device to present, on a display of the first device, a user interface notifying an end-user of the first device of an automatic disablement of the at least first audio component.

15. The method of claim 14, wherein the user interface includes a selectable option for re-enabling the at least first audio component.

16. The method of claim 11, wherein the triggering event must occur during a predefined window of time leading up to a start time of the communication session or during of a scheduled duration of the communication session.

17. The method of claim 16, wherein the triggering event is one of an access of a calendar invite for the communication session, a launch of a communication application hosting the communication session, a navigation to a webpage presenting an option to join the communication session, and a selection of the option to join the communication session.

18. The method of claim 11, wherein the first signal includes an ultrasonic-based signal or a Bluetooth-based signal.

19. The method of claim 11, further comprising:
   receiving, at the first device, a request to re-enable the first audio component; and
   in response to receiving the request, presenting a notification indicating the first audio component was intentionally disabled and requesting a confirmation of requested re-enabling of the first audio component.

20. The method of claim 11, wherein an identification code associated with the communication session is embedded in the first signal.

\* \* \* \* \*